(12) United States Patent
Marshall et al.

(10) Patent No.: US 11,933,669 B2
(45) Date of Patent: Mar. 19, 2024

(54) OPTICAL SYSTEM FOR IMPROVED RELIABILITY AND PERFORMANCE

(71) Applicant: Allegro MicroSystems, LLC, Manchester, NH (US)

(72) Inventors: Stephen A. Marshall, Portland, OR (US); Logan G. Stewart, Portland, OR (US); Michael Munroe, Londonderry, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 22 days.

(21) Appl. No.: 17/651,250

(22) Filed: Feb. 16, 2022

(65) Prior Publication Data

US 2023/0258496 A1     Aug. 17, 2023

(51) Int. Cl.
*G01J 1/44* (2006.01)
*G02B 26/08* (2006.01)

(52) U.S. Cl.
CPC ............ *G01J 1/44* (2013.01); *G01J 2001/444* (2013.01); *G02B 26/0833* (2013.01); *G02B 26/0883* (2013.01)

(58) Field of Classification Search
CPC .............................. G01J 1/44; G01J 2001/444
See application file for complete search history.

(56) References Cited

U.S. PATENT DOCUMENTS

| | | |
|---|---|---|
| 6,760,145 B1 | 7/2004 | Taylor et al. |
| 6,778,728 B2 | 8/2004 | Taylor et al. |
| 6,894,823 B2 | 5/2005 | Taylor et al. |
| 6,989,921 B2 | 1/2006 | Bernstein et al. |
| 7,015,780 B2 | 3/2006 | Bernstein et al. |
| 7,160,753 B2 | 1/2007 | Williams, Jr. |
| 7,432,537 B1 | 10/2008 | Huntington |
| 7,504,053 B1 | 3/2009 | Alekel |
| 7,764,719 B2 | 7/2010 | Munroe et al. |
| 7,782,911 B2 | 8/2010 | Munroe et al. |
| 7,852,549 B2 | 12/2010 | Alekel et al. |
| 7,885,298 B2 | 2/2011 | Munroe |
| 7,994,421 B2 | 8/2011 | Williams et al. |
| 8,207,484 B1 | 6/2012 | Williams |
| 8,319,307 B1 | 11/2012 | Williams |

(Continued)

FOREIGN PATENT DOCUMENTS

TW        201422772       6/2014

OTHER PUBLICATIONS

U.S. Appl. No. 17/566,763, filed Dec. 31, 2021, Huntington et al.

(Continued)

*Primary Examiner* — Thanh Luu
(74) *Attorney, Agent, or Firm* — DALY, CROWLEY, MOFFORD & DURKEE, LLP

(57) ABSTRACT

Described herein is a method and apparatus for an optical system configured to output redundant outputs, where the optical system includes at least one optical device configured to receive an optical signal; at least one optical transducer, wherein each at least one optical transducer is configured to receive the optical signal from the at least one optical device and convert the optical signal to an electrical signal; and at least one electronic device configured to receive each electrical signal and output the redundant outputs.

38 Claims, 15 Drawing Sheets

(56) References Cited

U.S. PATENT DOCUMENTS

| | | |
|---|---|---|
| 8,570,372 B2 | 10/2013 | Russell |
| 8,597,544 B2 | 12/2013 | Alekel |
| 8,630,036 B2 | 1/2014 | Munroe |
| 8,630,320 B2 | 1/2014 | Munroe et al. |
| 8,730,564 B2 | 5/2014 | Alekel |
| 8,743,453 B2 | 6/2014 | Alekel et al. |
| 8,760,499 B2 | 6/2014 | Russell |
| 8,766,682 B2 | 7/2014 | Williams |
| 8,853,639 B2 | 10/2014 | Williams, Jr. |
| 9,121,762 B2 | 9/2015 | Williams et al. |
| 9,197,233 B2 | 11/2015 | Gaalema et al. |
| 9,269,845 B2 | 2/2016 | Williams et al. |
| 9,368,933 B1 | 6/2016 | Nijjar et al. |
| 9,397,469 B1 | 7/2016 | Nijjar et al. |
| 9,447,299 B2 | 9/2016 | Schut et al. |
| 9,451,554 B1 | 9/2016 | Singh et al. |
| 9,466,745 B2 | 10/2016 | Williams et al. |
| 9,553,216 B2 | 1/2017 | Williams et al. |
| 9,591,238 B2 | 3/2017 | Lee et al. |
| 9,693,035 B2 | 6/2017 | Williams et al. |
| 9,759,602 B2 | 9/2017 | Williams |
| 9,804,264 B2 | 10/2017 | Villeneuve et al. |
| 9,810,775 B1 | 11/2017 | Welford et al. |
| 9,810,777 B2 | 11/2017 | Williams et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,835,490 B2 | 12/2017 | Williams et al. |
| 9,841,495 B2 | 12/2017 | Campbell et al. |
| 9,843,157 B2 | 12/2017 | Williams |
| 9,847,441 B2 | 12/2017 | Huntington |
| 9,857,468 B1 | 1/2018 | Eichenholz et al. |
| 9,869,754 B1 | 1/2018 | Campbell et al. |
| 9,874,635 B1 | 1/2018 | Eichenholz et al. |
| 9,897,687 B1 | 2/2018 | Campbell et al. |
| 9,905,992 B1 | 2/2018 | Welford et al. |
| 9,923,331 B2 | 3/2018 | Williams |
| 9,941,433 B2 | 4/2018 | Williams et al. |
| 9,958,545 B2 | 5/2018 | Eichenholz et al. |
| 9,989,629 B1 | 6/2018 | LaChapelle |
| 9,995,622 B2 | 6/2018 | Williams |
| 10,003,168 B1 | 6/2018 | Villeneuve |
| 10,007,001 B1 | 6/2018 | LaChapelle et al. |
| 10,012,732 B2 | 7/2018 | Eichenholz et al. |
| 10,061,019 B1 | 8/2018 | Campbell et al. |
| 10,088,559 B1 | 10/2018 | Weed et al. |
| 10,094,925 B1 | 10/2018 | LaChapelle |
| 10,114,111 B2 | 10/2018 | Russell et al. |
| 10,121,813 B2 | 11/2018 | Eichenholz et al. |
| 10,139,478 B2 | 11/2018 | Gaalema et al. |
| 10,169,678 B1 | 1/2019 | Sachdeva et al. |
| 10,169,680 B1 | 1/2019 | Sachdeva et al. |
| 10,175,345 B2 | 1/2019 | Rhee et al. |
| 10,175,697 B1 | 1/2019 | Sachdeva et al. |
| 10,191,155 B2 | 1/2019 | Curatu |
| 10,209,359 B2 | 2/2019 | Russell et al. |
| 10,211,592 B1 | 2/2019 | Villeneuve et al. |
| 10,211,593 B1 | 2/2019 | Lingvay et al. |
| 10,217,889 B2 | 2/2019 | Dhulla et al. |
| 10,218,144 B2 | 2/2019 | Munroe et al. |
| 10,241,198 B2 | 3/2019 | LaChapelle et al. |
| 10,254,388 B2 | 4/2019 | LaChapelle et al. |
| 10,254,762 B2 | 4/2019 | McWhirter et al. |
| 10,267,898 B2 | 4/2019 | Campbell et al. |
| 10,267,899 B2 | 4/2019 | Weed et al. |
| 10,267,918 B2 | 4/2019 | LaChapelle et al. |
| 10,275,689 B1 | 4/2019 | Sachdeva et al. |
| 10,295,668 B2 | 5/2019 | LaChapelle et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,338,199 B1 | 7/2019 | McWhirter et al. |
| 10,338,223 B1 | 7/2019 | Englard et al. |
| 10,340,651 B1 | 7/2019 | Drummer et al. |
| 10,345,437 B1 | 7/2019 | Russell et al. |
| 10,345,447 B1 | 7/2019 | Hicks |
| 10,348,051 B1 | 7/2019 | Shah et al. |
| 10,386,489 B2 | 8/2019 | Albelo et al. |
| 10,394,243 B1 | 8/2019 | Ramezani et al. |
| 10,401,480 B1 | 9/2019 | Gaalema et al. |
| 10,401,481 B2 | 9/2019 | Campbell et al. |
| 10,418,776 B2 | 9/2019 | Welford et al. |
| 10,445,599 B1 | 10/2019 | Hicks |
| 10,451,716 B2 | 10/2019 | Hughes et al. |
| 10,473,788 B2 | 11/2019 | Englard et al. |
| 10,481,605 B1 | 11/2019 | Maila et al. |
| 10,488,496 B2 | 11/2019 | Campbell et al. |
| 10,491,885 B1 | 11/2019 | Hicks |
| 10,502,831 B2 | 12/2019 | Eichenholz |
| 10,503,172 B2 | 12/2019 | Englard et al. |
| 10,509,127 B2 | 12/2019 | Englard et al. |
| 10,514,462 B2 | 12/2019 | Englard et al. |
| 10,520,602 B2 | 12/2019 | Villeneuve et al. |
| 10,523,884 B2 | 12/2019 | Lee et al. |
| 10,535,191 B2 | 1/2020 | Sachdeva et al. |
| 10,539,665 B1 | 1/2020 | Danziger et al. |
| 10,545,240 B2 | 1/2020 | Campbell et al. |
| 10,551,485 B1 | 2/2020 | Maheshwari et al. |
| 10,551,501 B1 | 2/2020 | LaChapelle |
| 10,557,939 B2 | 2/2020 | Campbell et al. |
| 10,557,940 B2 | 2/2020 | Eichenholz et al. |
| 10,571,567 B2 | 2/2020 | Campbell et al. |
| 10,571,570 B1 | 2/2020 | Paulsen et al. |
| 10,578,720 B2 | 3/2020 | Hughes et al. |
| 10,591,600 B2 | 3/2020 | Villeneuve et al. |
| 10,591,601 B2 | 3/2020 | Hicks et al. |
| 10,606,270 B2 | 3/2020 | Englard et al. |
| 10,627,495 B2 | 4/2020 | Gaalema et al. |
| 10,627,512 B1 | 4/2020 | Hicks |
| 10,627,516 B2 | 4/2020 | Eichenholz |
| 10,627,521 B2 | 4/2020 | Englard et al. |
| 10,636,285 B2 | 4/2020 | Haas et al. |
| 10,641,874 B2 | 5/2020 | Campbell et al. |
| 10,663,564 B2 | 5/2020 | LaChapelle |
| 10,663,585 B2 | 5/2020 | McWhirter |
| 10,677,897 B2 | 6/2020 | LaChapelle et al. |
| 10,677,900 B2 | 6/2020 | Russell et al. |
| 10,684,360 B2 | 6/2020 | Campbell |
| 2018/0069367 A1 | 3/2018 | Villeneuve et al. |
| 2018/0284239 A1 | 10/2018 | LaChapelle et al. |
| 2018/0284240 A1 | 10/2018 | LaChapelle et al. |
| 2018/0284275 A1 | 10/2018 | LaChapelle |
| 2018/0284280 A1 | 10/2018 | Eichenholz et al. |
| 2019/0310368 A1 | 10/2019 | LaChapelle |
| 2020/0191925 A1* | 6/2020 | Zheng .................. G01S 7/4863 |

OTHER PUBLICATIONS

U.S. Appl. No. 17/197,314, filed Mar. 10, 2021, Taylor et al.
U.S. Appl. No. 17/197,328, filed Mar. 30, 2021, Taylor et al.
U.S. Appl. No. 17/230,253, filed Apr. 14, 2021, Judkins, III et al.
U.S. Appl. No. 17/230,276, filed Apr. 14, 2021, Cadugan.
U.S. Appl. No. 17/230,277, filed Apr. 14, 2021, Judkins, III et al.
U.S. Appl. No. 17/352,829, filed Jun. 21, 2021, Huntington et al.
U.S. Appl. No. 17/352,937, filed Jun. 21, 2021, Cadugan et al.
U.S. Appl. No. 17/376,607, filed Jul. 15, 2021, Stewart et al.
U.S. Appl. No. 17/400,300, filed Aug. 12, 2021, Myers et al.
U.S. Appl. No. 17/402,065, filed Aug. 13, 2021, Lee et al.
U.S. Appl. No. 17/648,702, filed Jan. 24, 2022, Lee et al.
Voxtel Opto, "Eyesafe Laser Rangefinders & 3D Imaging Lidar Sensors and Components;" LRF Product Catalog; Jul. 9, 2020; 27 Pages (Part 1 of 2).
Voxtel Opto, "Eyesafe Laser Rangefinders & 3D Imaging Lidar Sensors and Components;" LRF Product Catalog; Jul. 9, 2020; 27 Pages (Part 2 of 2).

* cited by examiner

OPTICAL SYSTEM FOR IMPROVED RELIABILITY AND PERFORMANCE

BACKGROUND

Conventional optical systems implement reliability by duplicating an entire optical system. This may not be feasible in some optical systems due to size, cost, or technology. Thus, there is a need for an improved optical system that provides improved reliability and performance without having to duplicate the entire optical system.

SUMMARY

In accordance with the concepts described herein, redundancy is added to an optical system to improve reliability and/or performance.

In accordance with the concepts described herein, redundant coverage is provided in an optical system using a single photonic input rather than a duplicate system with a second emitter.

In accordance with the concepts described herein, a redundant optical receiver system is provided that satisfies functional safety requirements for systematic and random/statistical error prevention or detection.

In accordance with the concepts described herein, an optical system provides heterogeneous or homogenous redundancy to satisfy automotive functional safety requirements for systematic and random errors quantified in system safety requirements including Single Point Fault Metric coverage, Latent Fault Metric Coverage, Fault Tolerant Time, and to satisfy Hardware Safety Requirements specifying an allowable operating envelope.

In accordance with the concepts described herein, an optical system provides improve system bandwidth when utilizing high-frequency photonic input.

In accordance with the concepts described herein, an optical system provides backup if a fault is detected.

In accordance with the concepts described herein, an optical system provides a comparison for validity.

In accordance with the concepts described herein, an optical system provides workload sharing if a bandwidth of a single channel is insufficient for an input signal.

In accordance with the concepts described herein, an optical system provides hybrid functionality to switch from comparing similarly processing signals to the same workload sharing to process alternating inputs simultaneously, depending on the input frequency.

In accordance with the concepts described herein, an optical system includes an optical splitter and a duplicate and/or redundant optical transducers to sense a same input on each optical transducer.

In accordance with the concepts described herein, an optical system includes optical steering and a duplicate and/or redundant optical transducers to sense a same input on each optical transducer.

In accordance with the concepts described herein, an optical system includes duplicate and/or redundant read-out integrated circuits (ROICs).

In accordance with the concepts described herein, an optical system includes duplicate and/or redundant optical transducers and an increased focal area to apply a same input to each optical transducer.

In accordance with the concepts described herein, an optical system includes various methods of redundancy to achieve automotive functional safety standards and sufficient fault coverage.

In accordance with the concepts described herein, an optical system includes a duplicate and/or redundant ROICs for improving a level of safety from the ROICs and easing implementation into safety critical applications such as Automotive Safety Integrity Level (ASIL) applications.

In accordance with an aspect of the concepts described herein, an optical system is configured to output redundant outputs, including at least one optical device configured to receive an optical signal; at least one optical transducer, wherein each at least one optical transducer is configured to receive the optical signal from the at least one optical device and convert the optical signal to an electrical signal; and at least one electronic device configured to receive each electrical signal and output the redundant outputs.

In accordance with an aspect of the concepts described herein, each of the at least one optical device is one of an optical splitter and an optical steerer, wherein the optical splitter is configured to transmit the optical signal to each of the at least one optical transducer, and wherein the optical steerer is configured to steer the optical signal to each of the at least one optical transducer one at a time.

In accordance with an aspect of the concepts described herein, each of the at least one optical transducer comprises a plurality of optical elements, and wherein an output of each of the at least one optical transducer is produced by one of a plurality of signal paths through the at least one optical transducer.

In accordance with an aspect of the concepts described herein, the optical steerer is one of a micro-electromechanical system (MEMS) mirror, a rotational mirror, and a shifting prism.

In accordance with an aspect of the concepts described herein, the at least one electronic device is one of at least one read-out-integrated circuit (ROIC) and at least one sub-mount device, wherein each of the at least one ROIC is configured to perform signal processing, and wherein each of the at least one sub-mount device is a breakout circuit that is not configured to perform signal processing.

In accordance with an aspect of the concepts described herein, each of the at least one ROIC is further configured to perform redundant signal processing, where the redundant signal processing is one of homogeneous redundant signal processing and heterogeneous redundant signal processing, wherein homogeneous redundant signal processing is performing a same function using a same architecture, and wherein heterogeneous redundant signal processing is performing one of the same function using different architectures and different functions using different architectures.

In accordance with an aspect of the concepts described herein, each of the at least one ROIC is further configured to determine if a fault occurs in the redundant outputs and, if so, to reduce the two redundant outputs to one output.

In accordance with an aspect of the concepts described herein, the at least one ROIC is further configured to be one of multiple integrated circuits and one integrated circuit, wherein each of the multiple integrated circuits outputs one of the redundant outputs, and wherein the one integrated circuit outputs all of the redundant outputs.

In accordance with an aspect of the concepts described herein, the at least one optical device is one optical device, the at least one optical transducer is a first optical transducer and a second optical transducer, and the at least one electronic device is one read-out-integrated-circuit (ROIC) having two redundant paths for outputting the redundant outputs.

In accordance with an aspect of the concepts described herein, the one optical device is a lens configured to transmit the optical signal to the first optical transducer and the second optical transducer simultaneously.

In accordance with an aspect of the concepts described herein, the lens is one of a single lens, multiple lenses, an ellipsoid lens, and at least one lens with a lens geometry configured to have different focal lengths for x and y planar dimensions, wherein the ellipsoidal lens and the at least one lens match a shape of a focal area to a shape of a combination of the first optical transducer and the second optical transducer when an (x,y) aspect ratio of the combination of the first optical transducer and the second optical transducer is not equal to 1, and wherein the ellipsoidal lens and the at least one lens match a shape of a focal area to a shape of a combination of a first pixel of an optical transducer and a second pixel in the optical transducer when an (x,y) aspect ratio of the combination of the first pixel and the second pixel is not equal to 1.

In accordance with an aspect of the concepts described herein, the at least one optical device is one optical device, the at least one optical transducer is one optical transducer configured to transmit the electrical signal to the at least one electronic device, the at least one electronic device is a first read-out-integrated-circuit (ROIC) configured to output a first of the redundant outputs and a second ROIC configured to output a second of the redundant outputs, and the first ROIC and the second ROIC are further configured to be one of stacked and side-by-side.

In accordance with an aspect of the concepts described herein, the at least one optical device is one optical device, the at least one optical transducer is a first optical transducer and a second optical transducer, and the at least one electronic device is a first read-out-integrated-circuit (ROIC) and a second ROIC.

In accordance with an aspect of the concepts described herein, the at least one optical device is a first optical device and a second optical device, the at least one optical transducer is a first optical transducer and a second optical transducer, the at least one electronic device is a first read-out-integrated-circuit (ROIC) and a second ROIC, wherein the first optical device receives the optical signal, wherein the first optical transducer receives the optical signal from the first optical device and converts the optical signal to a first electrical signal, wherein the first ROIC receives the first electrical signal and processes the first electrical signal, wherein the second optical device receives the optical signal, wherein the second optical transducer receives the optical signal from the second optical device and converts the optical signal to a second electrical signal, wherein the second ROIC receives the second electrical signal and processes the second electrical signal, and further including an error criteria function block configured to provide error criteria concerning the processed first electrical signal and the processed second electrical signal; and a comparator configured to receive the error criteria, the processed first electrical signal, and the processed second electrical signal; determine if an error occurred in one of the processed first electrical signal and the processed second electrical signal; if no error occurred, output at least one of the processed first electrical signal and the processed second electrical signal; and if an error occurred, output an error flag and a function of the processed first electrical signal and the processed second electrical signal that is determined to be error free.

In accordance with an aspect of the concepts described herein, the at least one optical device is one optical device, the at least one optical transducer is a first optical transducer and a second optical transducer, the at least one electronic device is a first read-out-integrated-circuit (ROIC) and a second ROIC, wherein the one optical device receives the optical signal, wherein the first optical transducer receives the optical signal from the one optical device and converts the optical signal to a first electrical signal, wherein the first ROIC receives the first electrical signal and processes the first electrical signal, wherein the second optical transducer receives the optical signal from the one optical device and converts the optical signal to a second electrical signal, wherein the second ROIC receives the second electrical signal and processes the second electrical signal, and further including an error criteria function block configured to provide error criteria concerning the processed first electrical signal and the processed second electrical signal; and a comparator configured to receive the error criteria, the processed first electrical signal, and the processed second electrical signal; determine if an error occurred in one of the processed first electrical signal and the processed second electrical signal; if no error occurred, output at least one of the processed first electrical signal and the processed second electrical signal; and if an error occurred, output an error flag and a function of the processed first electrical signal and the processed second electrical signal that is determined to be error free.

In accordance with an aspect of the concepts described herein, the at least one optical device is one optical device, the at least one optical transducer is one optical transducer, the at least one electronic device is a first ROIC and a second ROIC, wherein the one optical device receives the optical signal, wherein the one optical transducer receives the optical signal from the one optical device and converts the optical signal to an electrical signal, wherein the first ROIC receives the electrical signal and processes the electrical signal, wherein the second ROIC receives the electrical signal and processes the electrical signal, and further including an error criteria function block configured to provide error criteria concerning the processed electrical signal from the first ROIC and the processed electrical signal from the second ROIC; and a comparator configured to receive the error criteria, the processed electrical signal from the first ROIC, and the processed electrical signal from the second ROIC; determine if an error occurred in one of the processed electrical signal from the first ROIC and the processed electrical signal from the second ROIC; if no error occurred, output at least one of the processed electrical signal from the first ROIC and the processed electrical signal from the second ROIC; and if an error occurred, output an error flag and a function of the processed electrical signal from the first ROIC and the processed electrical signal from the second ROIC that is determined to be error free.

In accordance with an aspect of the concepts described herein, the at least one optical device is one optical device, the at least one optical transducer is a first optical transducer and a second optical transducer, the at least one electronic device is an ROIC having a first processing path, a second processing path that is redundant of the first processing path, and a comparator, wherein the one optical device receives the optical signal, wherein the first optical transducer receives the optical signal from the one optical device and converts the optical signal to a first electrical signal, wherein the second optical transducer receives the optical signal from the one optical device and converts the optical signal to a second electrical signal, wherein the ROIC receives the first electrical signal and the second electrical signal, processes the first electrical signal by the first processing path, processes the second electrical by the second processing path, and compares the processed first electrical signal and the processed second electrical signal to determine if there is an error in either of the processed first electrical signal and the processed second electrical signal, and further including an error criteria function block configured to provide error criteria concerning the processed first electrical signal and the processed second electrical signal; wherein the comparator is configured to receive the error criteria, the processed first electrical signal, and the processed second electrical signal; determine if an error occurred in one of the processed first electrical signal and the processed second electrical signal; if no error occurred, the ROIC outputs at least one of the processed first electrical signal and the processed second electrical signal; and if an error occurred, the ROIC outputs an error flag and a function of the processed first electrical signal and the processed second electrical signal that is determined to be error free.

In accordance with an aspect of the concepts described herein, the at least one optical device is one optical device comprising a first diagnostics function block configured to provide diagnostics on the one optical device, the at least one optical transducer is a first optical transducer comprising a second diagnostics function block configured to provide diagnostics on the first optical transducer and a second optical transducer comprising a third diagnostics function block configured to provide diagnostics on the second optical transducer, the at least one electronic device is an ROIC having a first processing path, a second processing path that is redundant of the first processing path and comprising a fourth diagnostics function block configured to provide diagnostics on the ROIC, a global pixel reference function block comprising a fifth diagnostics function block configured to provide diagnostics on the global pixel reference function block, a global time-to-digital converter (TDC) references function block comprising a sixth diagnostics function block configured to provide diagnostics on the global TDC references function block, a temperature sensor comprising a seventh diagnostics function block configured to provide diagnostics on the temperature sensor, a clock and timing synchronization function block comprising an eighth diagnostics function block configured to provide diagnostics on the clock and timing synchronization function block, a digital converter comprising a comparator and a ninth diagnostics function block configured to provide diagnostics on the comparator, and a data output channels function block comprising a tenth diagnostics function block configured to provide diagnostics on the data output channels function block, wherein the one optical device receives the optical signal, wherein the first optical transducer receives the optical signal from the one optical device and converts the optical signal to a first electrical signal, wherein the second optical transducer receives the optical signal from the one optical device and converts the optical signal to a second electrical signal, wherein the ROIC receives the first electrical signal and the second electrical signal, processes the first electrical signal by the first processing path, processes the second electrical by the second processing path, and compares the processed first electrical signal and the processed second electrical signal to determine if there is an error in either of the processed first electrical signal and the processed second electrical signal, and further including an error criteria function block configured to provide error criteria concerning the processed first electrical signal and the processed second electrical signal; wherein the comparator is configured to receive the error criteria, the processed first electrical signal, the processed second electrical signal, and diagnostics from the first through tenth function diagnostic function blocks; determine if an error occurred in one of the processed first electrical signal and the processed second electrical signal; if no error occurred, the ROIC outputs at least one of the processed first electrical signal and the processed second electrical signal via the data output channels function block; and if an error occurred, the ROIC outputs an error flag and a function of the processed first electrical signal and the processed second electrical signal that is determined to be error free via the data output channels function block.

In accordance with an aspect of the concepts described herein, the comparator includes a subtractor configured to receive an output of the first processing path of the ROIC, receive an output of the second processing path of the ROIC, and subtract the output of the second processing path of the ROIC from the output of the first processing path of the ROIC; a second comparator configured to compare the output of the subtractor to an error tolerance; a combinatorial logic gate configured to perform a combinatorial logical operation on the output of the second comparator, a diagnostic on the first processing path of the ROIC, and a diagnostic on the second processing path of the ROIC, and to output an error flag when an error occurs; and an output data processor configured to receive the output of the first processing path of the ROIC, the output of the second processing path of the ROIC, and the output of the combinatorial logic gate, and a function of the outputs of the first processing path of the ROIC and the output of the second processing path of the ROIC that is determined to be error free.

In accordance with an aspect of the concepts described herein, the at least one optical device is a first optical device and a second optical device, the at least one optical transducer is a first optical transducer and a second optical transducer, the at least one electronic device is a first read-out-integrated-circuit (ROIC) and a second ROIC, wherein the first optical device receives the optical signal, wherein the first optical transducer receives the optical signal from the first optical device and converts the optical signal to a first electrical signal, wherein the first ROIC receives the first electrical signal and processes the first electrical signal, wherein the second optical device receives the optical signal, wherein the second optical transducer receives the optical signal from the second optical device and converts the optical signal to a second electrical signal, wherein the second ROIC receives the second electrical signal and processes the second electrical signal, and further including a diagnostic fault detector configured to receive the processed first electrical signal and the processed second electrical signal, determines if an error occurred in either of the processed first electrical signal and the processed second electrical signal, and outputs a control signal; and a switch configured to receive the processed first electrical signal, the processed second electrical signal, and the control signal, output the processed first electrical signal if no error occurred, and output a function of the first processed electrical signal and the processed second electrical signal that is error free when an error occurred.

In accordance with an aspect of the concepts described herein, the at least one optical device is a first optical device and a second optical device, the at least one optical transducer is a first optical transducer and a second optical transducer, the at least one electronic device is a first read-out-integrated-circuit (ROIC) and a second ROIC, and further including a demultiplexer configured to receive the optical signal and segment the optical signal into a first segment and a second segment, wherein the second segment does not contain any portion of the optical segment contained in the first segment; and a multiplexer; wherein the first optical device receives the first segment, wherein the first optical transducer receives the first segment from the first optical device and converts the first segment to a first electrical signal, wherein the first ROIC receives the first electrical signal and processes the first electrical signal, wherein the second optical device receives the second segment, wherein the second optical transducer receives the second segment from the second optical device and converts the second segment to a second electrical signal, wherein the second ROIC receives the second electrical signal and processes the second electrical signal, and wherein the multiplexer receives the processed first electrical signal and the processed second electrical signal, and outputs a combination of the processed first electrical signal and the processed second electrical signal.

In accordance with an aspect of the concepts described herein, the at least one optical device is a first optical device and a second optical device, the at least one optical transducer is a first optical transducer and a second optical transducer, the at least one electronic device is a first read-out-integrated-circuit (ROIC) and a second ROIC, and including a diagnostic fault detector; a mode selector configured to output one of a signal indicating a redundant/comparison mode and a workload-sharing mode under control of one of an input signal and a determination of the optical signal; a demultiplexer; and a multiplexer, wherein the demultiplexer receives the optical signal and segments the optical signal into a first segment and a second segment under control of the mode selector, wherein the first segment and the second segment are approximately identical when the mode selector outputs the signal indicating the redundant/comparison mode, and wherein the second segment does not contain any portion of the optical segment contained in the first segment when the mode selector outputs the signal indicating the workload-sharing mode; wherein the first optical device receives the first segment, wherein the first optical transducer receives the first segment from the first optical device and converts the first segment to a first electrical signal, wherein the first ROIC receives the first electrical signal and processes the first electrical signal, wherein the second optical device receives the second segment, wherein the second optical transducer receives the second segment from the second optical device and converts the second segment to a second electrical signal, wherein the second ROIC receives the second electrical signal and processes the second electrical signal, wherein the diagnostic fault detector receives the processed first electrical signal and the processed second electrical signal, and outputs an error flag for use during the redundant/comparison mode; and wherein the multiplexer receives the processed first electrical signal, the processed second electrical signal, the signal from the mode selector, and the error flag, when in the redundant/comparison mode, outputs the processed first electrical signal if no error occurred, and outputs a function of the first processed electrical signal and the processed second electrical signal that is error free when an error occurred, and, when in the workload-sharing mode, outputs a combination of the processed first electrical signal and the processed second electrical signal.

In accordance with an aspect of the concepts described herein, the at least one optical device is one optical device, the at least one optical transducer is one optical transducer, the at least one electronic device is a first read-out-integrated-circuit (ROIC) and a second ROIC, and further includes a demultiplexer; and a multiplexer, wherein the one optical device receives the optical signal, wherein the one optical transducer receives the optical signal from the one optical device and converts the optical signal to an electrical signal, wherein the demultiplexer receives the electrical signal and segments the electrical signal into a first segment and a second segment, each of the first segment and the second segment have frequencies that are half that of the optical signal, and the second segment does not contain any portion of the optical segment contained in the first segment; wherein the first ROIC receives the first segment and processes the first segment, wherein the second ROIC receives the second segment and processes the second segment, wherein the multiplexer receives the processed first segment and the processed second segment, and outputs a combination of the processed first segment and the processed second segment having a frequency equal to that of the optical signal.

In accordance with an aspect of the concepts described herein, the optical signal has a frequency of 100 kHz and the first segment and the second segment each has a frequency of 50 kHz.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

One embodiment of the concepts described herein concerns an optical system for improving reliability and/or performance.

A photodetector is defined as an optical transducer with no signal processing. A photoreceiver is defined as an optical transducer with signal processing (e.g., an ROIC). A sub-mount is defined as a breakout circuit with no signal processing that is used with photodetectors, where the sub-mount is used in place of an ROIC.

Figure 1:
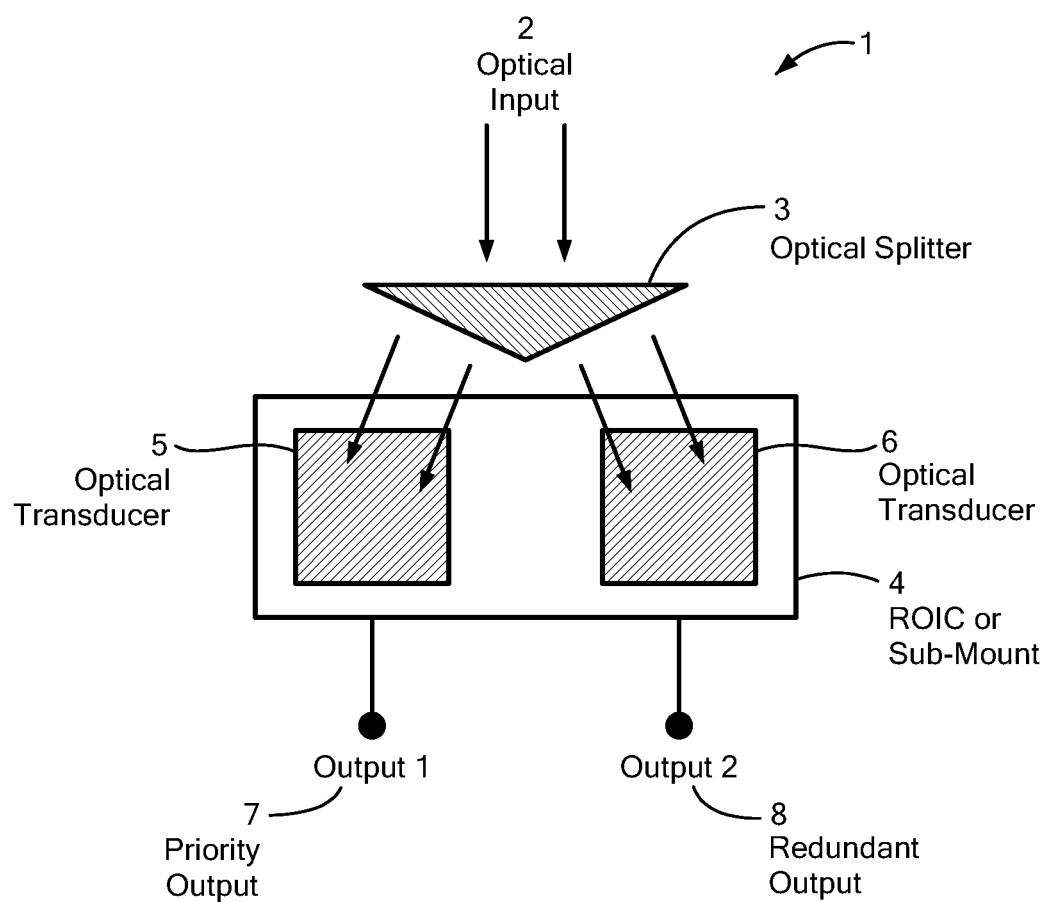
FIG. 1 is an illustration of an optical system of an embodiment of the concepts described herein with redundancy and optical splitting.

FIG. 1 is an illustration of an optical system 1 of an embodiment of the concepts described herein with redundancy and optical splitting.

Referring to FIG. 1, the optical system 1 includes an optical splitter 3, a first optical transducer 5, a second optical transducer 6, and an ROIC 4. In an alternate embodiment, the ROIC 4 is replaced with a sub-mount.

An optical input signal 2 is received by the optical splitter 3. The optical splitter 3 splits the optical input signal 2 into two signals that are approximately identical to each other. In an alternate embodiment, the optical splitter 3 splits the optical input signal 2 into two signals that are not approximately identical to each other (e.g., the optical input signal 2 is split into a first portion of the optical input signal 2 and a second portion of the optical input signal 2, where the two portions may or may not comprise the entirety of the optical input signal 2). In an alternate embodiment, the optical splitter 3 splits the optical input signal 2 into n signals, where n is a positive integer.

The first of the two signals split by the optical splitter 3 is transmitted to the first optical transducer 5. The second of the two signals split by the optical splitter 3 is transmitted to the second optical transducer 6. In an alternate embodiment, there are n optical transducers, where n is a positive integer. The first optical transducer 5 and the second optical transducer 6 each converts the optical input signal transmitted thereto to an electronic signal. Each of the first optical transducer 5 and the second optical transducer 6 may include a plurality of optical elements, where an output of each of the first optical transducer 5 and the second optical transducer 6 may have a plurality of signal paths.

The first optical transducer 5 and the second optical transducer 6 each transmits an electronic signal to the ROIC 4. The ROIC 4 processes each of the electronic signals received by the ROIC 4 in a manner that should produce the same result on a first output 7 and a second output 8 when no fault has occurred in the optical system 1. In an embodiment of the present invention, the ROIC 4 processes each of the electronic signals received using an identical function in an identical architecture. In an alternate embodiment of the present invention, the ROIC 4 processes each of the electronic signals received using an identical function in a different architecture. In another alternate embodiment of the present invention, the ROIC 4 processes each of the electronic signals received using a different function in a different architecture that should produce approximately identical results when there is no fault in the optical system 1. The output 7 and the output 8 of the ROIC 4 may be monitored to determine if no fault has occurred in the optical system 1 (e.g., the output 7 and the output 8 are approximately identical) or if a fault has occurred in the optical system 1 (e.g., the output 7 and the output 8 are not approximately identical).

FIG. 1 illustrates how redundancy is achieved by splitting the incoming optical input signal 2, where each part of the split signal is mapped to discrete, redundant first optical transducer 5 and second optical transducer 6.

Any sufficient method for optical splitting that is presently known or developed in the future may be used in the present invention.

In an alternate embodiment of the present invention, the ROIC 4 may include a comparison function to check and compare the first output 7 and the second output 8 and produce one output based on the first output 7 and the second output 8 (e.g., output one of the first output 7 and the second output 8 when the first output 7 and the second output 8 are approximately identical, output one of the first output 7 and the second output 8 when the first output 7 and the second output 8 are not approximately identical by determining which of the first output 7 and the second output 8 is correct, output a function of the first output 7 and the second output 8, etc.).

In an alternate embodiment of the present invention, all, or a portion of, the ROIC 4 may be redundant. In another alternate embodiment of the present invention, the ROIC 4 may be replaced with a sub-mount as described above, where all, or a portion of, the sub-mount, may be redundant.

In an alternate embodiment of the present invention, the ROIC 4 may have n outputs, where n is any positive integer.

Redundancy in any component described above or below may be heterogeneous redundancy or homogeneous redundancy. "Heterogeneous redundancy" indicates using two or more different design approaches to detect and process an input. "Homogeneous redundancy" indicates using a redundant (e.g., identical) copy of a design architecture and comparing the outputs of redundant components to determine if a fault/error occurred or not.

It is often desired to achieve higher levels of functional safety coverage. Two different design approaches (e.g., heterogeneous redundancy) are used to eliminate systematic design errors. Systematic design errors indicate errors that are built into the design that are not caused by a random defect but are a byproduct of a design architecture. Using two different designs (e.g., heterogeneous redundancy) reduces a risk that a systematic error will affect both redundant components at the same time.

Homogeneous redundancy is used when there is not a significant risk of systematic design error, or it is impractical to use two different design approaches. Homogeneous redundancy is used when the risk of random or statistical failure is high.

Figure 2A:
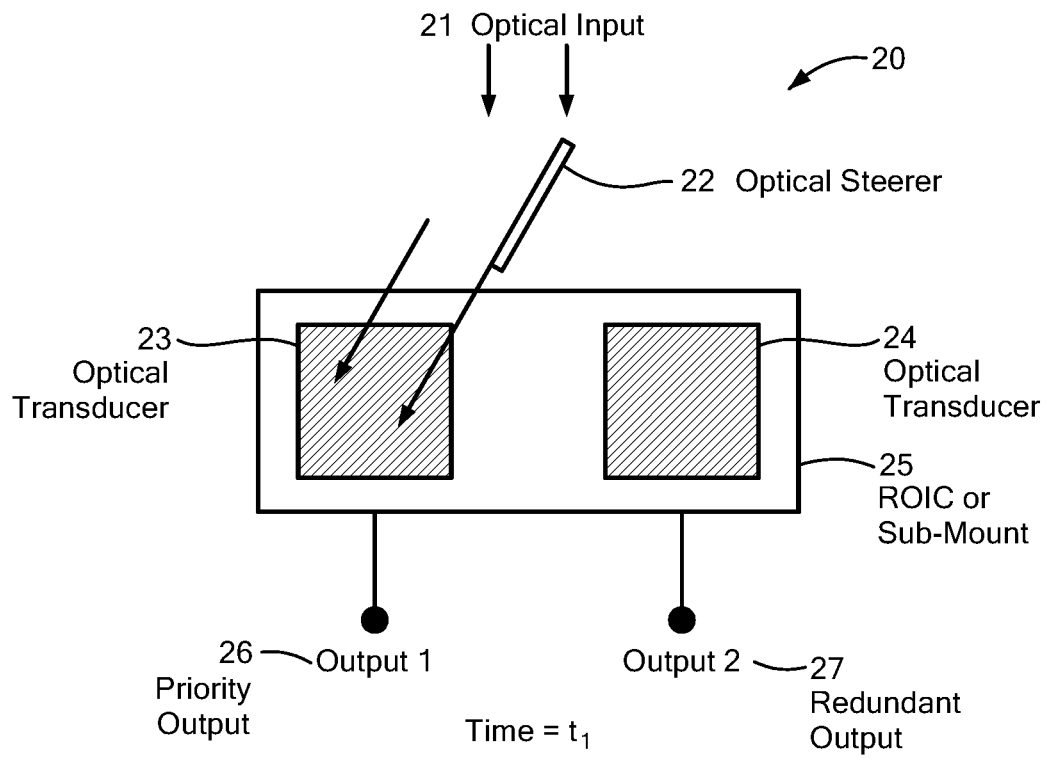
FIGS. 2A and 2B are illustrations of an optical system of an embodiment of the concepts described herein with redundancy and optical steering.
Figure 2B:
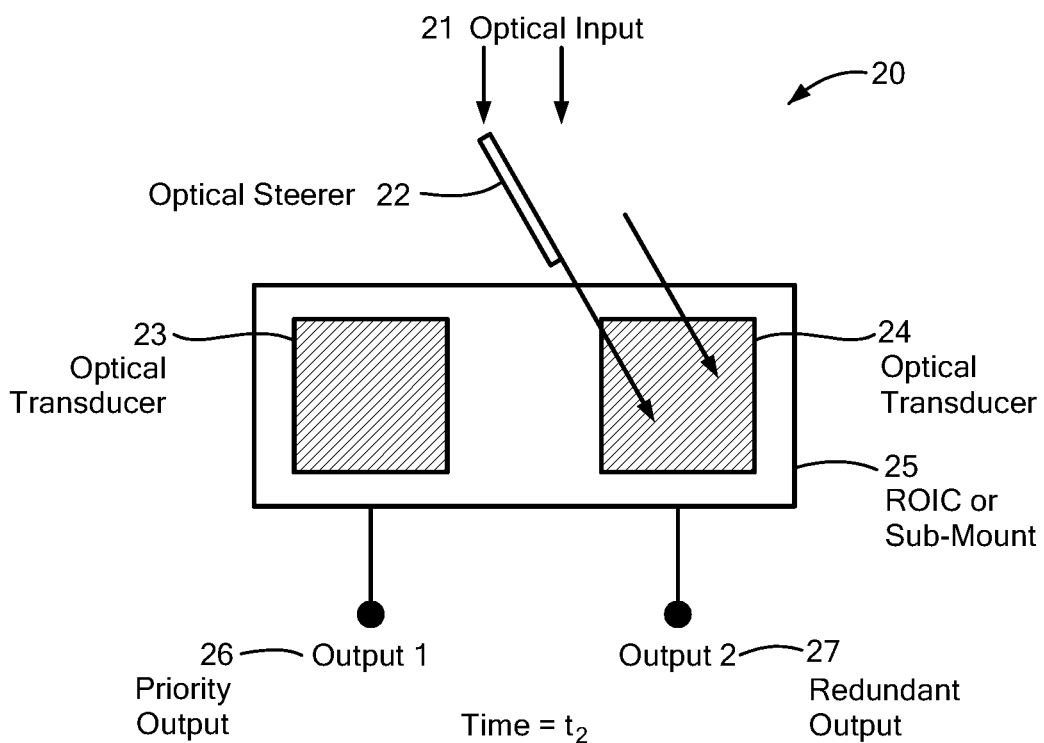

FIGS. 2A and 2B are illustrations of an optical system 20 of an embodiment of the concepts described herein with redundancy and optical steering.

Referring to FIGS. 2A and 2B, the optical system 20 includes an optical steerer 22, a first optical transducer 23, a second optical transducer 24, and an ROIC 25. In an alternate embodiment, the optical system 20 may include n optical transducers and/or a sub-mount, as described above, instead of the ROIC 25.

At time $t_1$, an optical input signal 21 is received by the optical steerer 22. The optical steerer 22 steers the optical input signal 21 to the first optical transducer 23. However, the present invention is not limited to steering the optical input signal 21 to one of two optical transducers. In an alternate embodiment, the optical steerer 22 may steer the optical input signal 21 to any of n optical transducers, where n is a positive integer.

The first optical transducer 23 receives the optical input signal 21 and converts the optical input signal 21 to an electronic signal and transmits the electronic signal to the ROIC 25 for processing. The ROIC 25 outputs a first output signal 26.

At time $t_2$, the optical input signal 21 is received by the optical steerer 22. The optical steerer 22 steers the optical input signal 21 to the second optical transducer 24.

The second optical transducer 24 receives the optical input signal 21 and converts the optical input signal 21 to an electronic signal and transmits the electronic signal to the ROIC 25 for processing. The ROIC 25 outputs a second output signal 27. The first output signal 26 and the second output signal 27 may be compared by the ROIC 25 or another component to determine if a fault has occurred in either the first output signal 26 or the second output signal 27.

FIGS. 2A and 2B illustrate how redundancy is achieved by steering an optical input signal, where the entirety of the optical input signal is mapped to one discrete optical transducer at a time. A steering control directs the mapping to different optical transducers over time. Sampling of the output occurs only when the corresponding optical transducer is active.

Any number of optical steering techniques may be used for the optical system 20 (e.g., micro-electro-mechanical-system (MEMS) mirrors, rotational mirrors, shifting prisms, etc.).

The ROIC 25 may be used to check and compare the first output signal 26 and the second output signal 27 and reduce the first output signal 26 and the second output signal 27 to one output signal.

Additional redundancy may be included at the ROIC/Sub-Mount level (e.g., either by including redundancy in the circuit design of the ROIC 25 or the sub-mount or by using multiple ROICs or sub-mounts).

Each of the first optical transducer 23 and the second optical transducer 24 may contain a plurality of optical elements (where the output of each of the first optical transducer 23 and the second optical transducer 24 may have a plurality of signal paths).

Heterogeneous redundancy or homogeneous redundancy may be used in the optical system 20, where heterogeneous redundancy or homogeneous redundancy are described above.

Figure 3A:
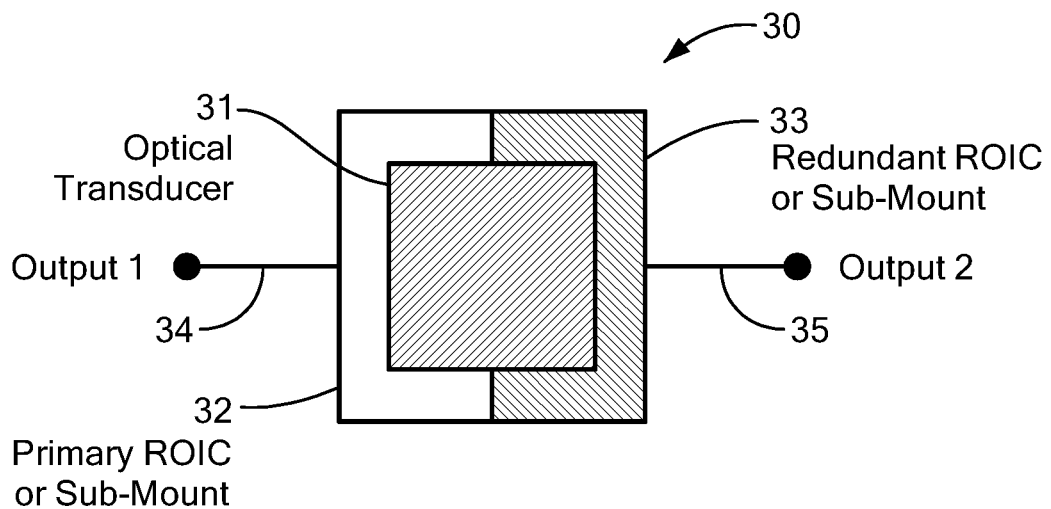
FIGS. 3A and 3B are illustrations of a top view and a side view, respectively, of an optical system of an embodiment of the concepts described herein with redundancy and multiple ROICs.
Figure 3B:
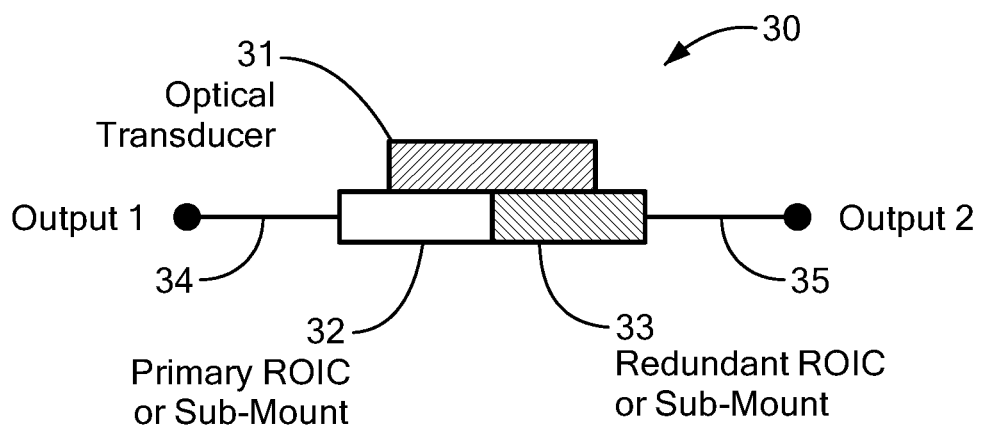

FIGS. 3A and 3B are illustrations of a top view and a side view, respectively, of an optical system 30 of an embodiment of the concepts described herein with redundancy and multiple ROICs.

Referring to FIGS. 3A and 3B, the optical system 30 includes an optical transducer 31, a primary ROIC 32, and a secondary ROIC 33. In an alternate embodiment, the primary ROIC 32, and the secondary ROIC 33 are replaced with a primary sub-mount, as described above, and a secondary sub-mount, respectively.

An optical input signal is received by the optical transducer 31. The optical transducer 32 converts the optical input signal to an electrical signal and transmits the electrical signal to the primary ROIC 32 and the secondary ROIC 33 for processing. The optical transducer 31 may contain a plurality of optical elements, where an output of the optical transducer 31 may have a plurality of signal paths.

The primary ROIC 32 outputs a first output signal 34 and the secondary ROIC 33 outputs a second output signal 35. The first output signal 34 and the second output signal 35 may be compared by either the primary ROIC 32, the secondary ROIC 33, or another component to determine if a fault has occurred in either the first output signal 34 or the second output signal 35.

FIGS. 3A and 3B illustrate how redundancy may be achieved by using multiple ROICs 32, 33 or sub-mounts with a single optical transducer 31.

The redundant primary ROIC 32 and secondary ROIC 33 are illustrated in FIGS. 3A and 3B as being side-by-side. However, the present invention is not limited thereto. Any other physical implementation of redundant ROICs 32, 33 or sub-mounts may be used (e.g., stacked).

Redundant ROICs 32, 33 or sub-mounts may be implemented as two discrete components or as a single component. However, the present invention is not limited to using two ROICs 32, 33 or two sub-mounts. The present invention may use n ROICs or sub-mounts, where n is any positive integer. Heterogeneous redundancy or homogeneous redundancy, as described above, may be used for in the optical system 30.

Figure 4A:
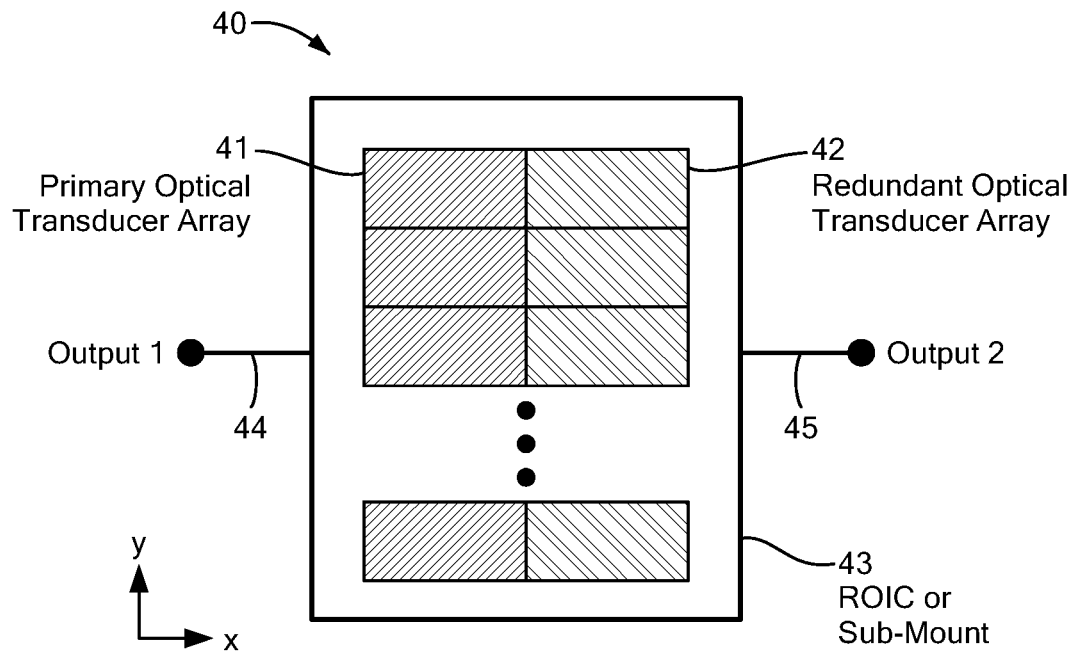
FIGS. 4A and 4B are illustrations of a top view and a side view, respectively, of an optical system of an embodiment of the concepts described herein with redundancy and multiple optical transducers.
Figure 4B:
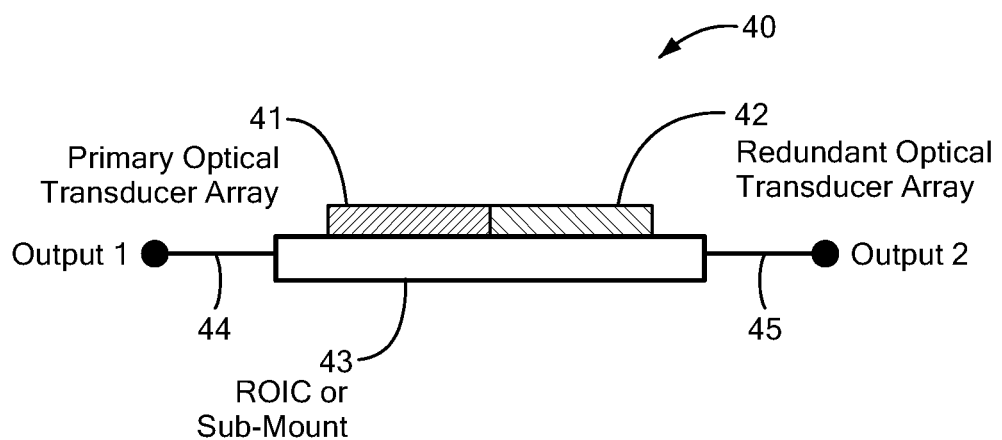

FIGS. 4A and 4B are illustrations of a top view and a side view, respectively, of an optical system 40 of an embodiment of the concepts described herein with redundancy and multiple optical transducers.

Referring to FIGS. 4A and 4B, the optical system 40 includes a primary optical transducer 41, a secondary optical transducer 42 (i.e., a redundant optical transducer), and an ROIC 43. In an alternate embodiment, the ROIC 43 is replaced with a sub-mount, as described above.

An optical input signal is received by the primary optical transducer 41 and the secondary optical transducer 42. Each of the primary optical transducer 41 and the secondary optical transducer 42 converts the optical input signal to an electrical signal and transmits the electrical signal (i.e., an electrical signal from the primary optical transducer 41 and an electrical signal from the secondary optical transducer 42) to the ROIC 43 for processing. Each of the primary optical transducer 41 and the secondary optical transducer 42 may contain a plurality of optical elements, where outputs of the primary optical transducer 41 and the secondary optical transducer 42 may each have a plurality of signal paths.

The ROIC 43 outputs a first output signal 44 and a second output signal 45. The first output signal 44 and the second output signal 45 may be compared by the ROIC 43 or another component to determine if a fault has occurred in either the first output signal 44 or the second output signal 45.

FIGS. 4A and 4B illustrate how redundancy may be achieved by implementing multiple optical transducers with a single ROIC. In an alternate embodiment, two or more ROICs may be used for a combination of techniques as illustrated in FIGS. 3A and 3B and described above. Heterogeneous redundancy or homogeneous redundancy, as described above, may be used for in the optical system 40.

Figure 4C:
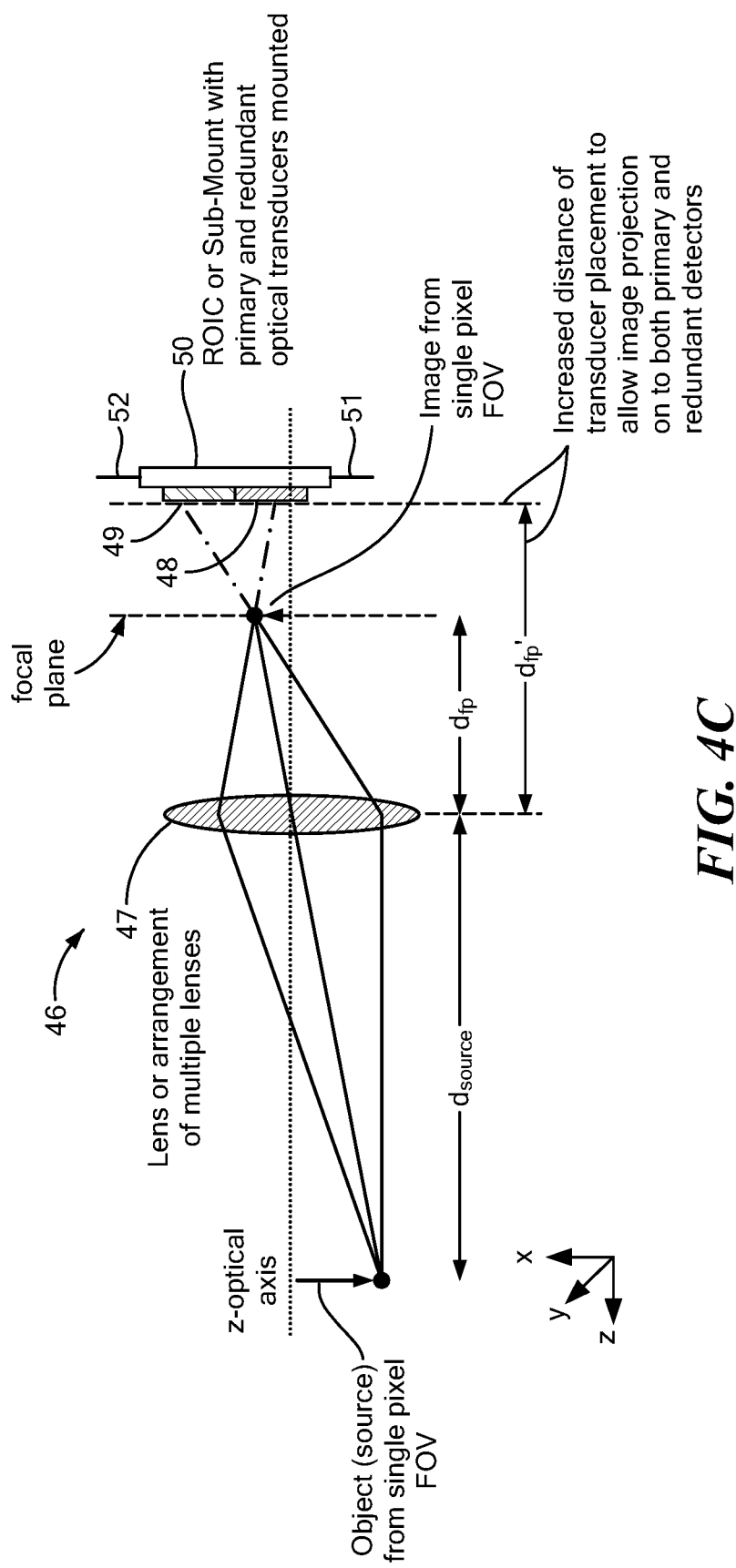
FIG. 4C is an illustration of a side view of an optical system of an embodiment of the concepts described herein with an increased placement distance for increasing a focal area to accommodate a primary optical transducer and a redundant optical transducer.

FIG. 4C is an illustration of a side view of an optical system 46 of an embodiment of the concepts described herein with an increased placement distance for increasing a focal area to accommodate a primary optical transducer 48 and a secondary optical transducer 49 (i.e., a redundant optical transducer).

Referring to FIG. 4C, the optical system 46 includes a lens 47, a primary optical transducer 48, a secondary optical transducer 49 (i.e., a redundant optical transducer), and an ROIC 50. In an alternate embodiment, the lens 47 is replaced with a plurality of lenses (e.g., multiple lenses in series) and/or the ROIC 50 is replaced with a sub-mount, as described above.

An optical input signal from an object (i.e., a source) from a single pixel field of view (FOV) and a distance $d_{source}$ from the lens 47 is received by the lens 47. The lens 47 focuses the object on a focal plane that is a distance $d_{fp}$ from the lens 47. The optical input signal is then received by the primary optical transducer 48 and the secondary optical transducer 49 at a distance $d_{fp'}$ from the lens 47, where $d_{fp'}$ is greater than $d_{fp}$. Each of the primary optical transducer 48 and the secondary optical transducer 49 converts the optical input signal to an electrical signal and transmits the electrical signal (i.e., an electrical signal from the primary optical transducer 48 and an electrical signal from the secondary optical transducer 49) to the ROIC 50 for processing. Each of the primary optical transducer 48 and the secondary optical transducer 49 may contain a plurality of optical elements, where outputs of the primary optical transducer 48 and the secondary optical transducer 49 may each have a plurality of signal paths.

The ROIC 50 outputs a first output signal 51 and a second output signal 52. The first output signal 51 and the second output signal 52 may be compared by the ROIC 50 or another component to determine if a fault has occurred in either the first output signal 51 or the second output signal 52.

FIG. 4C illustrates how redundancy may be achieved by implementing multiple optical transducers with a single ROIC. In an alternate embodiment, two or more ROICs may be used for a combination of techniques as illustrated in FIGS. 3A and 3B and described above. Heterogeneous redundancy or homogeneous redundancy, as described above, may be used for in the optical system 40.

In addition, redundancy is achieved without optical steering or splitting. Instead, redundancy is achieved by using two optical transducers and increasing a focal area of an image of an object to illuminate both optical transducers. This is achieved by increasing the distance of a Focal Plane Array (FPA) of the primary optical transducer 48 and the secondary optical transducer 49 from the lens 47 from $d_{fp}$ to $d_{fp'}$. This allows light from the object (i.e., the source) in the pixel FOV to be incident on both the primary optical transducer 48 and secondary optical transducer 49 (i.e., the redundant optical transducer) at the same time. This is applicable to one dimensional (1-D) arrays where pixel pitch is constrained in only one of two planar dimensions (x, y). However, it may be applied to single pixel designs or two-dimensional (2-D) pixel arrays.

Figure 5:
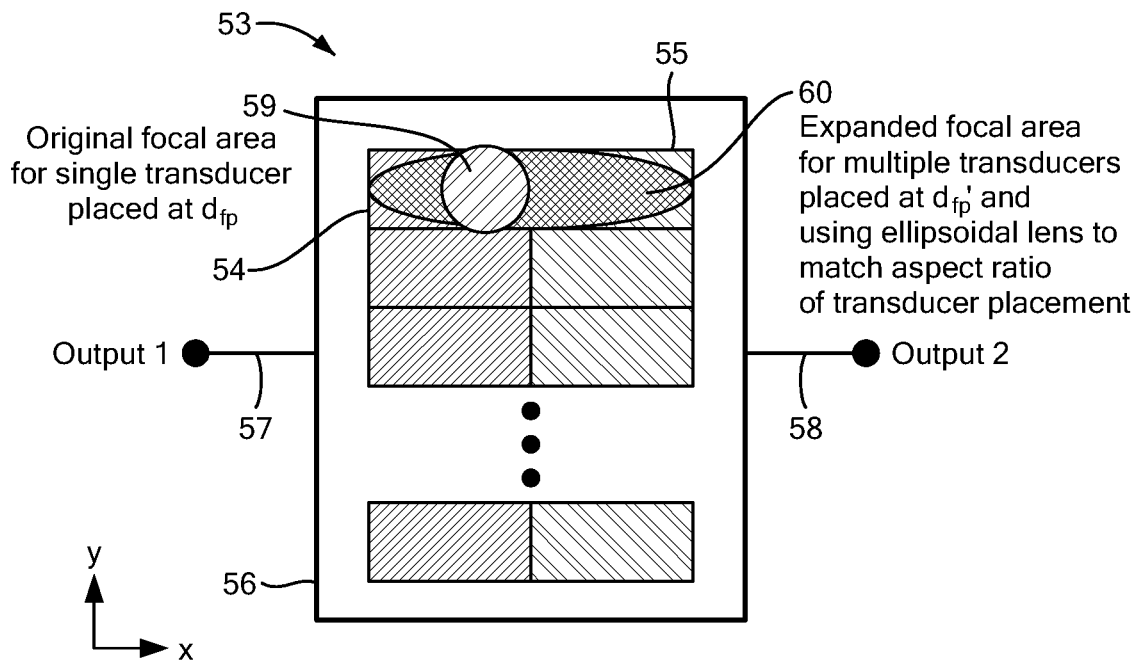
FIG. 5 is an illustration of a top view of an optical system of an embodiment of the concepts described herein with an expanded focal area to accommodate a first optical transducer, a second optical transducer, and an ellipsoidal lens to match an aspect ratio of an area of the first optical transducer and the second optical transducer.

FIG. 5 is an illustration of a top view of an optical system 53 of an embodiment of the concepts described herein with an expanded focal area to accommodate a first optical transducer 54, a second optical transducer 55 (i.e., a redundant optical transducer), and an ellipsoidal lens (not shown) to match an aspect ratio of an area of the first optical transducer 54 and the second optical transducer 55. In an alternate embodiment, there may be n optical transducers, where n is any positive integer.

Referring to FIG. 5, the optical system 53 includes an ellipsoidal lens (not shown), a primary optical transducer 54, a secondary optical transducer 55 (i.e., a redundant optical transducer), and an ROIC 56. The ellipsoidal lens is used, instead of the lens 47 in FIG. 4C, to match a shape of a focal area to a shape of the combined primary optical transducer 54 and the secondary optical transducer 55, when the (x,y) aspect ratio 60 of the primary optical transducer 54 and the secondary optical transducer 55 is not equal to 1. For comparison purposes, an aspect ratio 59 of 1 is superimposed on the aspect ratio 60 that is not equal to 1. In an alternate embodiment, the ellipsoid lens is replaced with another lens geometry resulting in different focal lengths for the x and y planar dimensions and/or the ROIC 56 is replaced with a sub-mount, as described above.

An optical input signal from an object (i.e., a source) from a single pixel field of view (FOV) and a distance $d_{source}$ from the ellipsoid lens is received by the ellipsoid lens. The ellipsoid lens focuses the object on a focal plane that is a distance $d_{fp}$ from the ellipsoid lens. The optical input signal is then received by the primary optical transducer 54 and the secondary optical transducer 55 at a distance $d_{fp'}$ from the ellipsoid lens, where $d_{fp'}$ is greater than $d_{fp}$. Each of the primary optical transducer 54 and the secondary optical transducer 55 converts the optical input signal to an electrical signal and transmits the electrical signal (i.e., an electrical signal from the primary optical transducer 54 and an electrical signal from the secondary optical transducer 55) to the ROIC 56 for processing. Each of the primary optical transducer 54 and the secondary optical transducer 55 may contain a plurality of optical elements, where outputs of the primary optical transducer 54 and the secondary optical transducer 55 may each have a plurality of signal paths.

Figure 6:
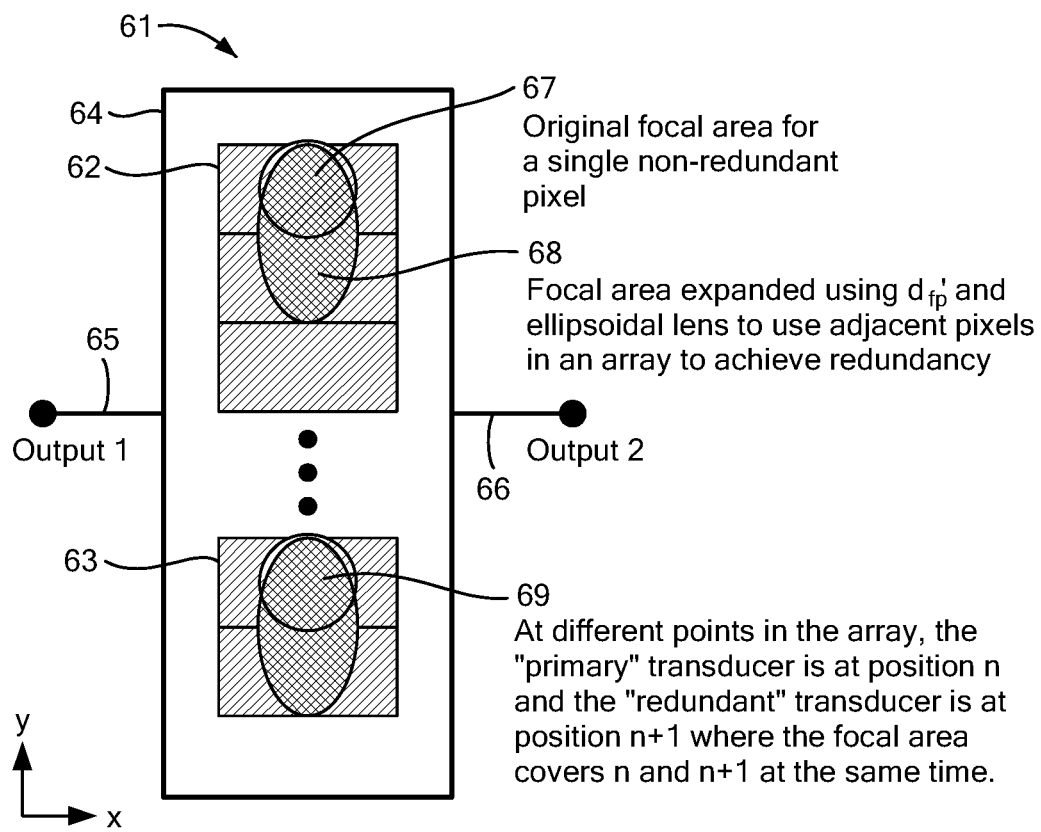
FIG. 6 is an illustration of a top view of an optical system of an embodiment of the concepts described herein with redundancy achieved using adjacent pixels in an array and an expanded focal area.

FIG. 6 is an illustration of a top view of an optical system 60 of an embodiment of the concepts described herein with redundancy achieved using adjacent pixels in an array and an expanded focal area.

Referring to FIG. 6, the optical system 61 includes an ellipsoidal lens (not shown), a primary optical transducer 62, a secondary optical transducer 63, and an ROIC 64. The ellipsoidal lens is used, instead of the lens 47 in FIG. 4C, to match a shape of a focal area to a shape of the combined adjacent pixels in each of the primary optical transducer 62 and the secondary optical transducer 63 at the same time, when the (x,y) aspect ratio 68 of the adjacent pixels in each of the primary optical transducer 62 and the secondary optical transducer 63 is not equal to 1. For comparison purposes, an aspect ratio 67 of 1 is superimposed on the aspect ratio 68 that is not equal to 1. In an alternate embodiment, the ellipsoid lens is replaced with another lens geometry resulting in different focal lengths for the x and y planar dimensions and/or the ROIC 64 is replaced with a sub-mount, as described above.

An optical input signal from an object (i.e., a source) from a single pixel field of view (FOV) and a distance $d_{source}$ from the ellipsoid lens is received by the ellipsoid lens. The ellipsoid lens focuses the object on a focal plane that is a distance $d_{fp}$ from the ellipsoid lens. The optical input signal is then received by the adjacent pixels in each of the primary optical transducer 62 and the secondary optical transducer 63 at a distance $d_{fp'}$ from the ellipsoid lens, where $d_{fp'}$ is greater than $d_{fp}$. Each of the primary optical transducer 62 and the secondary optical transducer 63 converts the optical input signal to an electrical signal and transmits the electrical signal (i.e., an electrical signal from the primary optical transducer 62 and an electrical signal from the secondary optical transducer 63) to the ROIC 64 for processing. Each of the primary optical transducer 62 and the secondary optical transducer 63 may contain a plurality of optical elements, where outputs of the primary optical transducer 62 and the secondary optical transducer 63 may each have a plurality of signal paths.

In FIG. 6, an array of optical transducers of size N+1 is illustrated where redundancy may be achieved by using adjacent pixels and expanding a focal area to cover two or more adjacent pixels simultaneously. In this way, redundancy is achieved for an array of arbitrary size N where the cost of redundancy is only 1 additional pixel for the entire array. This applies to a single element array (N=1), which would require 2 total pixels, or it may apply to any size of N where only 1 additional pixel is needed. The focal length is adjusted to illuminate two or more adjacent pixels simultaneously and an ellipsoidal lens may be used to optimize the total focal area to match the aspect ratio of the adjacent pixels.

The present invention discloses an optical system for redundant coverage using a single photonic input, rather than a duplicate system with a second emitter. This is beneficial when a system-level redundant solution is not feasible due to size, cost, or technology.

The present invention discloses an optical system with redundancy to satisfy functional safety requirements for systematic and random/statistical error prevention or detection.

The present invention discloses an optical system with heterogeneous or homogenous redundancy to satisfy automotive functional safety requirements for systematic and random errors quantified in system safety requirements including Single Point Fault Metric coverage, Latent Fault Metric Coverage, Fault Tolerant Time, and to satisfy Hardware Safety Requirements specifying the allowable operating envelope.

The present invention discloses an optical system with improved system bandwidth when utilizing high-frequency photonic input. When utilizing a steerer, one channel may be used to process every X returns, where X is the number of redundant systems being implemented. This allows for X times the processing speed of a frame (e.g., one full pass of an entire field of view) or, in other words, X times more time for each detector plus an ROIC to process the return. This is useful when the limiting factor in the optical system is receiver bandwidth and not emitter bandwidth.

The present invention discloses an optical system that utilizes redundancy for backup if a fault is detected, which is also known as "fail-over" operation. During typical operation, a redundant channel(s) is not utilized until it is determined through diagnostics that information on a primary channel is unreliable. When such a determination is made, the optical system switches to using the redundant channel(s).

The present invention discloses an optical system that utilizes comparison for validity. During typical operation, each channel processes the same signal in parallel and a comparison circuit (either within the component or downstream in the system signal processing) is used to check the outputs of the channels against each other to determine if a fault has occurred.

The present invention discloses an optical system with workload sharing. If a bandwidth of a single channel is insufficient for an input signal, redundant channels may be implemented to parallel process alternating inputs.

The present invention discloses an optical system with hybrid functionality. In dynamic bandwidth systems, the redundant channel may switch from comparison processing (e.g., processing the same input simultaneously and comparing the results) to workload sharing (e.g., processing alternating inputs simultaneously) depending on an input frequency.

The various methods of achieving redundancy described in the present disclosure may be selected based on an automotive safety fault coverage analysis to provide sufficient fault coverage to meet a given safety standard.

The present invention discloses an optical system where the optical system includes an optical device, an optical transducer, and an ROIC. Each of these components may have independent levels of systematic error potential and random error potential. Based on the systematic and random error potential of each component in an optical system, the present invention discloses that one or all of the system components may be implemented with redundancy. Methods claimed herein offer several ways to create redundancy of certain integrated system components (e.g., an optical transducer and/or an ROIC) while minimizing the system cost of maintaining two entirely separate and redundant systems.

The present invention discloses an optical system where heterogeneous redundancy is used in a component that has a high potential for systematic error.

The present invention discloses an optical system where homogenous redundancy is used in a component that has a high potential for random or statistical error.

Some examples of optical systems are illustrated in FIGS. 7, 8, 9, and 10, and described below. The exemplary optical systems are not exhaustive and may be implemented with either heterogeneous redundancy or homogenous redundancy in any or all parts of the optical systems. Two heterogeneous optical transducers may be used in conjunction with homogenous ROICs, for example. Such an optical system may be determined based on design failure modes and fault metrics of the individual components in the optical system.

Figure 7:
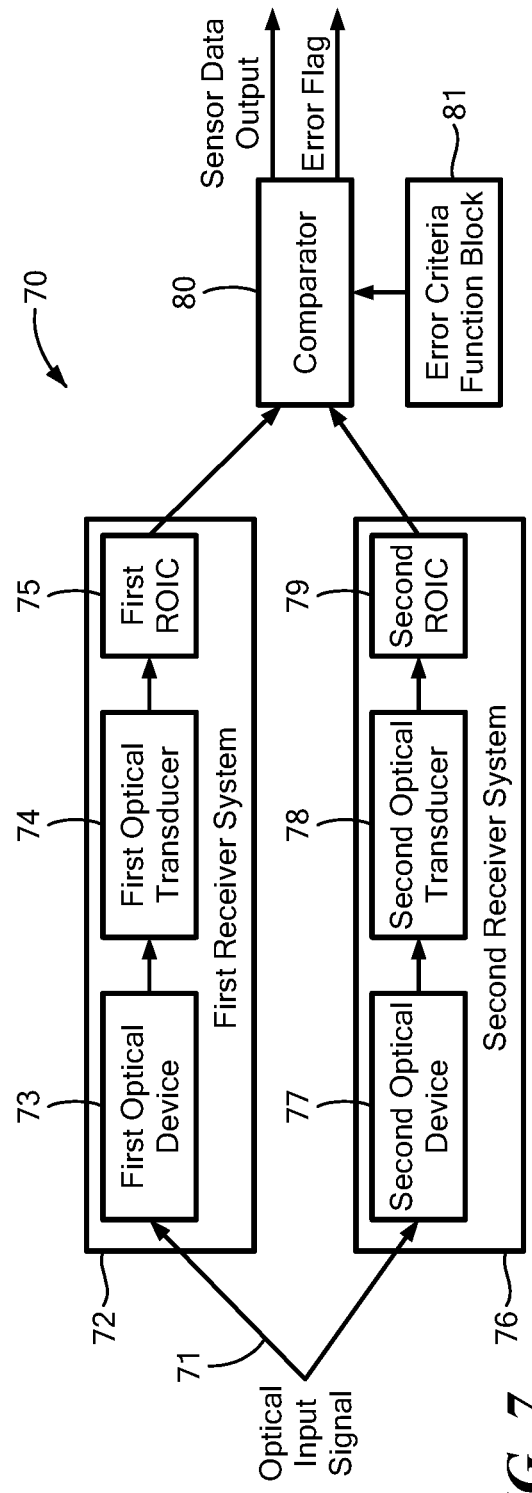
FIG. 7 is an illustration of an optical system of an embodiment of the concepts described herein with redundant optical receiver systems with two completely separate paths and a comparison performed external to the redundant optical receiver systems.

FIG. 7 is an illustration of an optical system 70 of an embodiment of the concepts described herein with redundant optical receiver systems with two completely separate paths and a comparison performed by a comparator 80 external to the redundant optical receiver systems.

Referring to FIG. 7, the optical system 70 includes a first receiver system 72, a second receiver system 76, which is redundant of the first receiver system 72, the comparator 80, and an error criteria function block 81.

The first receiver system 72 includes a first optical device 73, a first optical transducer 74, and a first ROIC 75. The first optical device 73 receives an optical input signal 71 and transmits the optical input signal 71 to the first optical transducer 74. The first optical transducer 74 converts the optical input signal 71 to an electrical signal and transmits the electrical signal to the first ROIC 75. The first ROIC 75 processes the electrical signal and transmits the processed electrical signal to the comparator 80. The optical device 73 may be an optical splitter, an optical steerer, or any other suitable optical device.

The second receiver system 76 is redundant of first receiver system 72. That is, the second receiver system 76 includes a second optical device 77 identical to the first optical device 73, a second optical transducer 78 identical to the first optical transducer 74, and a second ROIC 79 identical to the first ROIC 75. The second optical device 77 receives the optical input signal 71 and transmits the optical input signal 71 to the second optical transducer 78. The second optical transducer 78 converts the optical input signal 71 to an electrical signal and transmits the electrical signal to the second ROIC 79. The second ROIC 79 processes the electrical signal in the same manner as the first ROIC 75 and transmits the processed electrical signal to the comparator 80. The optical device 77 may be an optical splitter, an optical steerer, or any other suitable optical device.

The comparator 80 receives error criteria from the error criteria function block 81 and the outputs of the first ROIC 75 and the second ROIC 79. Using the error criteria, the comparator 80 compares the outputs of the first ROIC 75 and the second ROIC 79, determines if a fault has occurred in the processing of the optical input signal 71 by either the first receiver system 72 or the second receiver system 76, outputs a function of the outputs of the first ROIC 75 and the second ROIC 79 as a sensor data output, and outputs an error flag signal. The error flag signal indicates whether a fault occurred in the processing of the optical input signal 71 by the first receiver system 72 or the second receiver system 76. If no fault occurred then the sensor data output is the output of either the first ROIC 75 or the second ROIC 79. In an alternate embodiment, if a fault occurred then the sensor data output is either the output of the first ROIC 75 or the second ROIC 79 that is determined to not include a fault. In another alternate embodiment, if a fault occurred then the sensor data output is a function of both the first ROIC 75 and the second ROIC 79 (e.g., an average of the outputs of the first ROIC 75 and the second ROIC 79).

Figure 8:
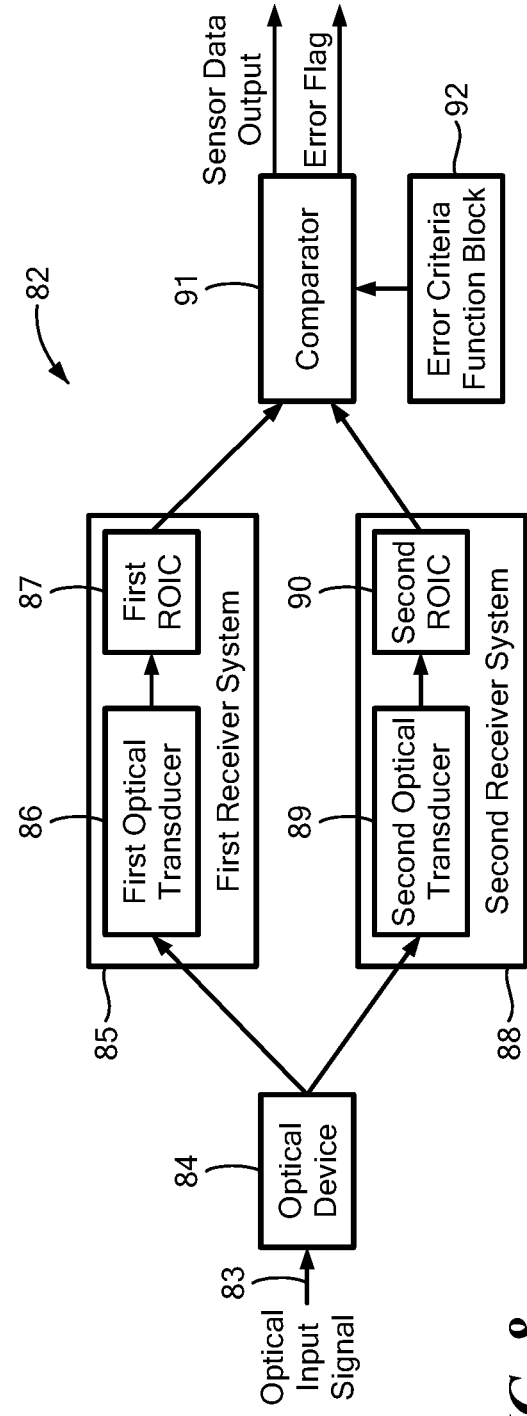
FIG. 8 is an illustration of an optical system of an embodiment of the concepts described herein with a single optical device, redundant optical transducers, and redundant ROICs.

FIG. 8 is an illustration of an optical system 82 of an embodiment of the concepts described herein with a single optical device 84, redundant optical transducers and redundant ROICs.

The optical system 82 has redundant optical transducers and ROICs, but only a single optical device. This configuration is selected when a risk of design failure modes and random failures for the optical system 82 is low or the optical device is too costly to make redundant. The optical system 82 offers an improved cost as compared to a fully redundant optical system. The optical device 84 may be an optical splitter, an optical steerer, or any other suitable optical device.

Referring to FIG. 8, the optical system 82 includes the single optical device 84, a first receiver system 85, a second receiver system 88, which is redundant of the first receiver system 85, a comparator 91, and an error criteria function block 92. The optical device 84 receives an optical input signal 83 and transmits the optical input signal 83 to the first receiver system 85 and the second receiver system 88.

The first receiver system 85 includes a first optical transducer 86 and a first ROIC 87. The first optical transducer 86 converts the optical input signal 83 to an electrical signal and transmits the electrical signal to the first ROIC 87. The first ROIC 87 processes the electrical signal and transmits the processed electrical signal to the comparator 91.

The second receiver system 88 is redundant of first receiver system 85. That is, the second receiver system 88 includes a second optical transducer 89 identical to the first optical transducer 86, and a second ROIC 90 identical to the first ROIC 87. The second optical transducer 89 converts the optical input signal 83 to an electrical signal and transmits the electrical signal to the second ROIC 90. The second ROIC 90 processes the electrical signal in the same manner as the first ROIC 87 and transmits the processed electrical signal to the comparator 91.

The comparator 91 receives error criteria from the error criteria function block 92 and the outputs of the first ROIC 87 and the second ROIC 90. Using the error criteria, the comparator 91 compares the outputs of the first ROIC 87 and the second ROIC 90, determines if a fault has occurred in the processing of the optical input signal 83 by either the first receiver system 85 or the second receiver system 88, outputs a function of the outputs of the first ROIC 87 and the second ROIC 90 as a sensor data output, and outputs an error flag signal. The error flag signal indicates whether a fault occurred in the processing of the optical input signal 83 by the first receiver system 85 or the second receiver system 88. If no fault occurred then the sensor data output is the output of either the first ROIC 87 or the second ROIC 90. In an alternate embodiment, if a fault occurred then the sensor data output is either the output of the first ROIC 87 or the second ROIC 90 that is determined to not include a fault. In another alternate embodiment, if a fault occurred then the sensor data output is a function of both the first ROIC 87 and the second ROIC 90 (e.g., an average of the outputs of the first ROIC 87 and the second ROIC 90).

Figure 9:
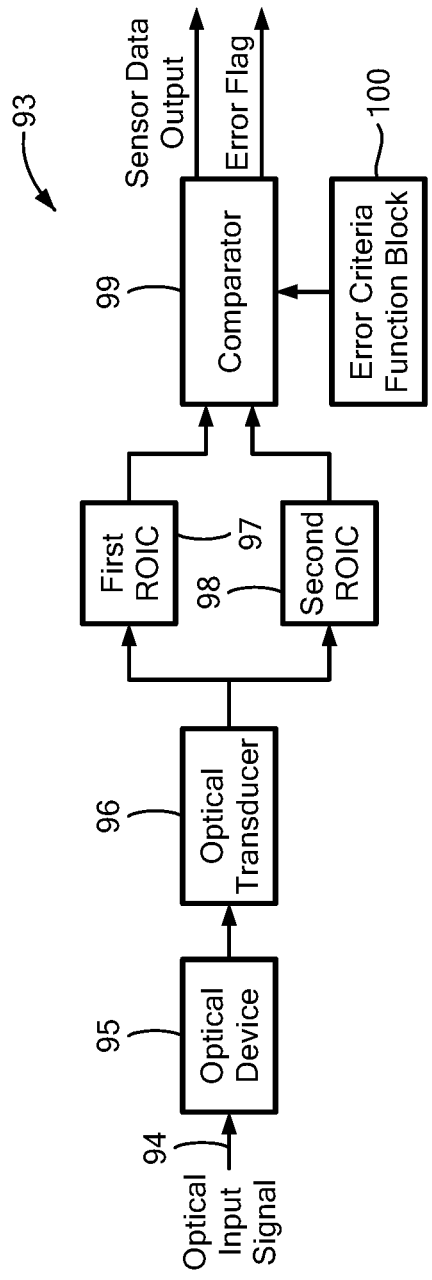
FIG. 9 is an illustration of an optical system of an embodiment of the concepts described herein with a single optical device, a single optical transducer, and redundant ROICs.

FIG. 9 is an illustration of an optical system 93 of an embodiment of the concepts described herein with a single optical device 95, a single optical transducer 96, and redundant ROICs.

The optical system 93 is selected when a risk of design failure modes and random failures for the optical system 93 and the optical transducer 96 are sufficiently low.

Referring to FIG. 9, the optical system 93 includes the single optical device 95, the single optical transducer 96, a first ROIC 97, a second ROIC 98, which is redundant of the first ROIC 97, a comparator 99, and an error criteria function block 100. The optical device 95 receives an optical input signal 94 and transmits the optical input signal 94 to the optical transducer 96.

The optical transducer 96 converts the optical input signal 94 to an electrical signal and transmits the electrical signal to the first ROIC 97 and the second ROIC 98. The first ROIC 97 and the second ROIC 98 each process the electrical signal and transmit the processed electrical signals to the comparator 99.

The comparator 99 receives error criteria from the error criteria function block 100 and the outputs of the first ROIC 97 and the second ROIC 98. Using the error criteria, the comparator 99 compares the outputs of the first ROIC 97 and the second ROIC 98, determines if a fault has occurred in the processing of the optical input signal 94 by either the first ROIC 97 or the ROIC 98, outputs a function of the outputs of the first ROIC 97 and the second ROIC 98 as a sensor data output, and outputs an error flag signal. The error flag signal indicates whether a fault occurred in the processing of the optical input signal 94 by the first ROIC 97 or the second ROIC 98. If no fault occurred then the sensor data output is the output of either the first ROIC 97 or the second ROIC 98. In an alternate embodiment, if a fault occurred then the sensor data output is either the output of the first ROIC 97 or the second ROIC 98 that is determined to not include a fault. In another alternate embodiment, if a fault occurred then the sensor data output is a function of both the first ROIC 97 and the second ROIC 98 (e.g., an average of the outputs of the first ROIC 97 and the second ROIC 98).

Figure 10:
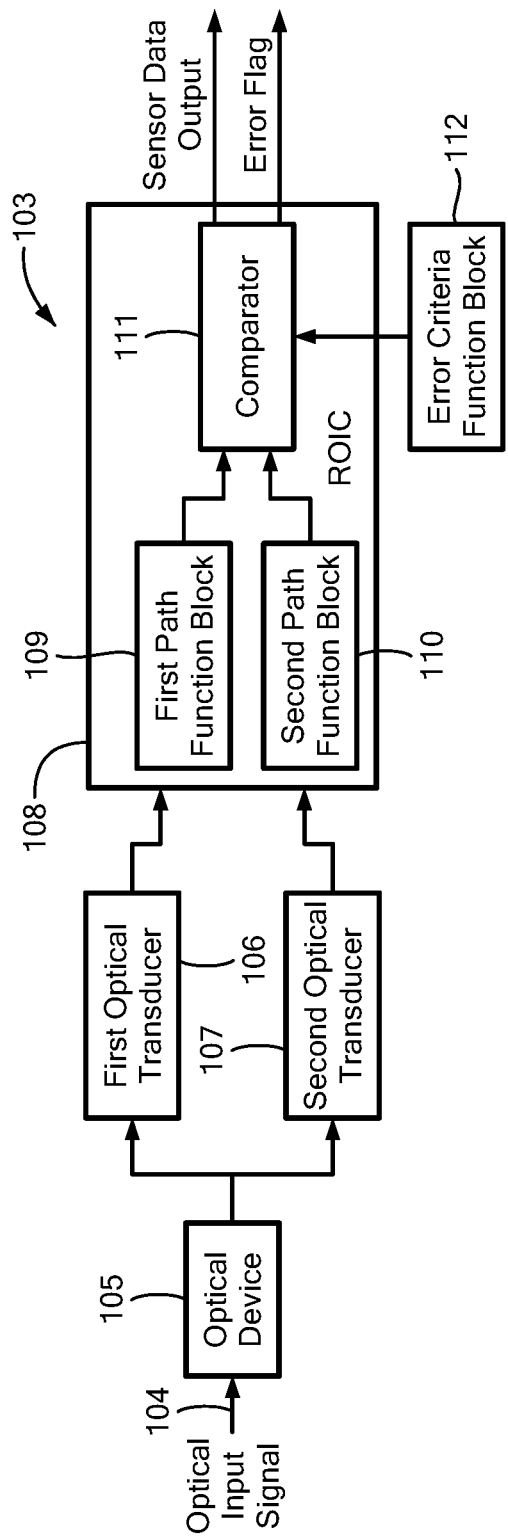
FIG. 10 is an illustration of an optical system of an embodiment of the concepts described herein with a single optical device, redundant optical transducers, and a single ROIC with internal redundancy through two parallel processing paths and a comparison function block.

FIG. 10 is an illustration of an optical system 103 of an embodiment of the concepts described herein with a single optical device 105, redundant optical transducers, and a single ROIC 108 with internal redundancy through two parallel processing paths and a comparator 111. The optical system 103 provides a cost-savings through integration while still achieving some level of redundancy.

Referring to FIG. 10, the optical system 103 includes the single optical device 105, a first optical transducer 106, a second optical transducer 107, which is redundant of the first optical transducer 106, an ROIC 108 that includes two parallel processing paths and the comparator 111, and an error criteria function block 112.

The optical device 105 receives an optical input signal 104 and transmits the optical input signal 104 to the first optical transducer 106 and the first optical transducer 107.

The first optical transducer 106 and the second optical transducer 107 each converts the optical input signal 104 to an electrical signal and transmits the electrical signals to the ROIC 108.

The ROIC 108 processes the electrical signals along a first path function block 109 and a second path function block 110, respectively, where the second path function block 110 is redundant of the first path function block 109, and transmits the processed electrical signals to the comparator 111.

The comparator 111 receives error criteria from the error criteria function block 112 and the outputs of the first path function block 109 and the second path function block 110. Using the error criteria, the comparator 111 compares the outputs of the first path function block 109 and the second path function block 110, determines if a fault has occurred in the processing of the optical input signal 104 by either the first path function block 109 including the first optical transducer 106 and the second path function block 110 including the second optical transducer 107, outputs a function of the outputs of the first path function block 109 and the second path function block 110 as a sensor data output, and outputs an error flag signal. The error flag signal indicates whether a fault occurred in the processing of the optical input signal 104 by the first path function block 109 including the first optical transducer 106 or the second path function block 110 including the second optical transducer 107. If no fault occurred then the sensor data output is the output of either the first path function block 109 or the second path function block 110. In an alternate embodiment, if a fault occurred then the sensor data output is either the output of the first path function block 109 or the second path function block 110 that is determined to not include a fault. In another alternate embodiment, if a fault occurred then the sensor data output is a function of both the first path function block 109 and the second path function block 110 (e.g., an average of the outputs of the first path function block 109 and the second path function block).

A choice between the implementations of the optical systems of FIGS. 8, 9, and 10 may be made in the context of achieving a particular Automotive Safety Integrity Level (ASIL). For a rating of ASIL-B, the optical system as a whole must achieve a 90% Single Point Fault Metric (SPFM) and a 60% Latent Fault Metric (LFM), whereas a rating of ASIL-D, the optical system must achieve a 99% SPFM and a 90% LFM.

SPFM is defined as any fault affecting one component of a safety system that corrupts the output of that system, and LFM is defined as any fault affecting more than one component (multi-point fault) that is not detected by the system or the operator. Such faults may be errors which are either systematic or random.

When an SPFM or LFM of an individual component in a system, such as an optical transducer or an ROIC is high, then it is desirable to make that component redundant. If an optical transducer is analyzed and found to have an 80% SPFM and a 40% LFM, then the optical transducer would not be sufficient to use in a system to achieve an ASIL-B rating, as these fault metrics will propagate to the rest of the system. In this case, the optical transducer may be made redundant as in FIG. 10. Similarly, if an ROIC also has an insufficient SPFM and LFM, then the ROIC and an optical transducer may be made redundant as in FIG. 8.

Figure 11:
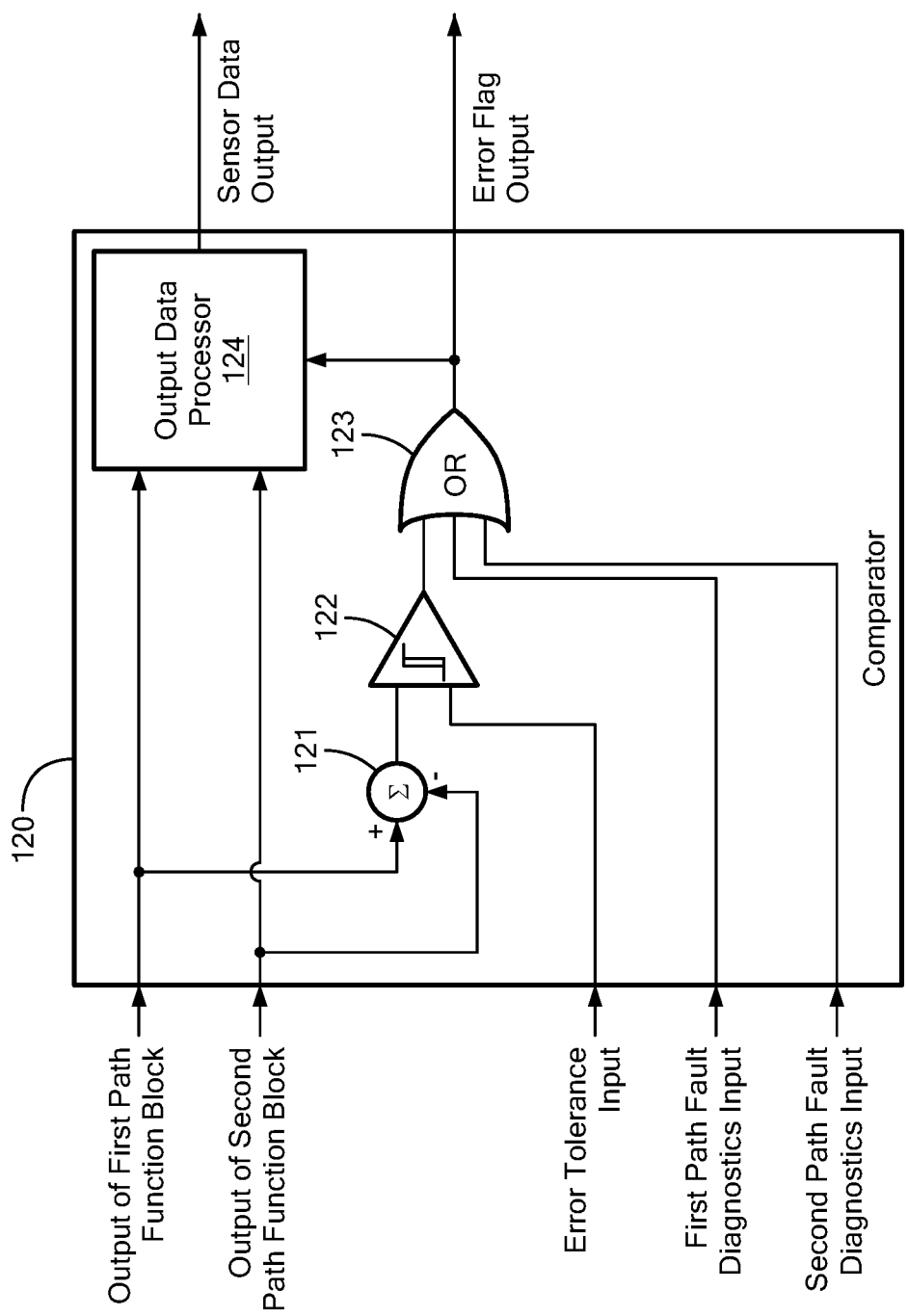
FIG. 11 is an illustration of a comparator of an embodiment of the concepts described herein.

FIG. 11 is an illustration of a comparator 120 of an embodiment of the concepts described herein.

Referring to FIG. 11, the comparator 120 includes a subtractor 121, a second comparator 122, and OR gate 123, and an output data processor 124.

The subtractor 121 receives an output of a first path function block of an ROIC and an output of a second path function block of the ROIC. In an alternate embodiment, the subtractor 121 receives outputs of a first ROIC and a second ROIC in place of the outputs of the first path function block and the second path function block, respectively, where the second ROIC is redundant of the first ROIC. The subtractor 121 subtracts the output of the second path function block from the output of the first path function block and outputs the result.

The second comparator 122 receives the output of the subtractor 121 and an error tolerance input, compares the two inputs, and outputs a result of the comparison.

The OR gate 123 receives the output of the comparator 122, a first path fault diagnostic input, a second path fault diagnostic input, and outputs an OR functions of these three inputs as an error flag signal for the comparator 120. However, the present invention is not limited to using the OR gate 123. Instead of an OR gate 123, any combinatorial logic or other device that is configured to determine if a combination of states of at least one diagnostic signal may be used to generate an error flag output.

The output data processor 124 receives the output of the first path function block, the output of the second path function block, and the output of the OR gate 123. The output data processor 124 processes the three inputs and outputs a signal as a sensor data output.

The outputs of the redundant first path function block and the second path function block are subtracted and compared to an acceptable error threshold. If an error between the first path function block and the second path function block exceeds a defined error tolerance threshold then the error flag output is raised, indicating a possible failure in an optical system. Any additional diagnostic signals from either the first path function block or the second path function block may also raise the error flag signal. The output data processor 124 is used to decide which output of the first path function block and the second path function block to use. In the case of an embodiment that implements a backup architecture, the output data processor 124 may be a switch which switches the sensor data output from the output of first path function block to the output of the second path function block in the event of an Error Flag. It may also be implemented as (a) an averaging algorithm of both paths, such as in a homogeneous implementation, or (b) it may simply ignore one of the paths and only pass the primary path output, such as in the case of a heterogeneous implementation or (c) it may pass all data from both paths to the output, or (d) it may disable the output if an error is detected.

Fault diagnostics from either the first path function block or the second path function block may consist of any diagnostic detectors and may include temperature out-of-range detection, data out-of-range detection, reference out-of-range detection, timing out-of-range detection, etc.

Figure 12:
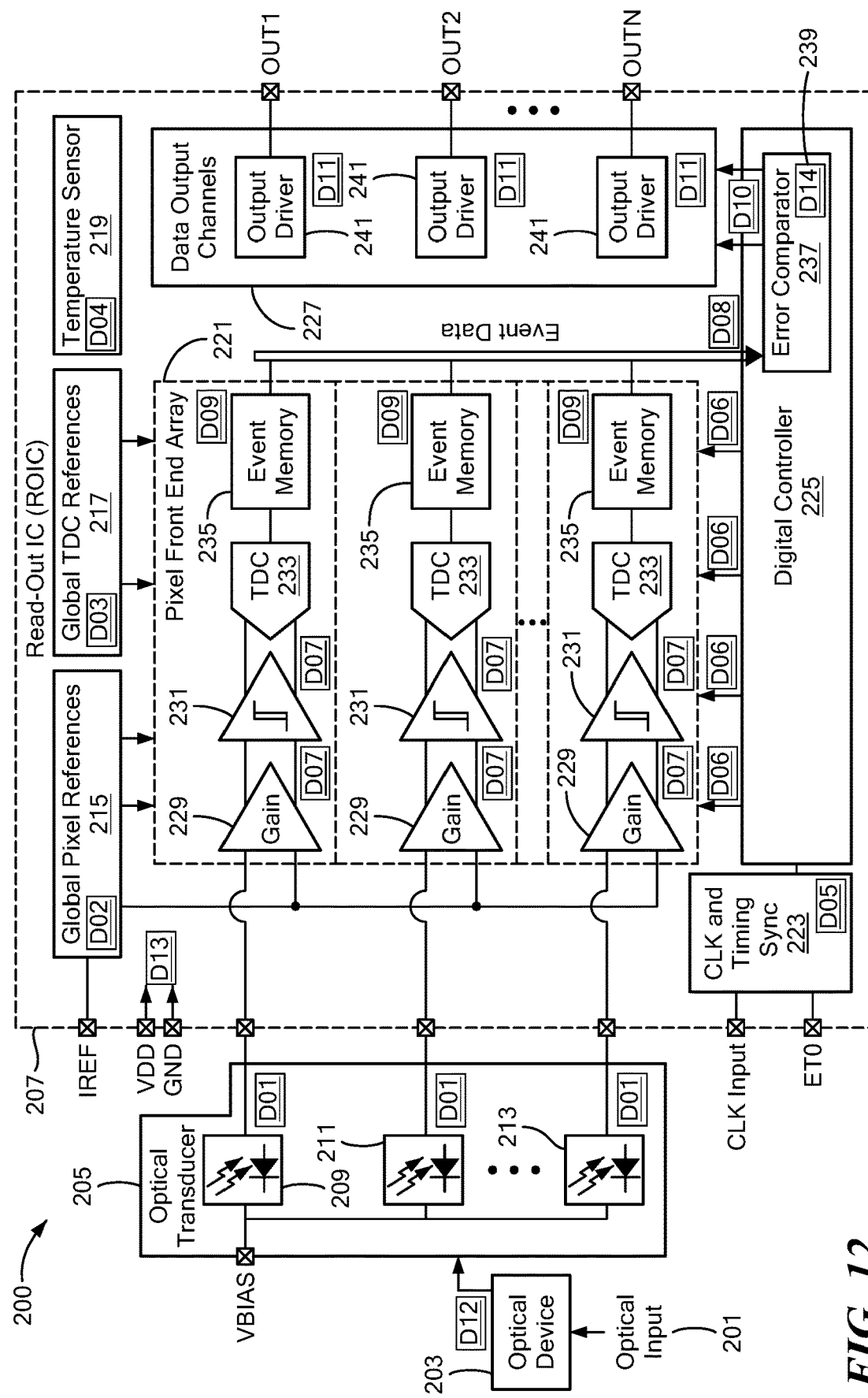
FIG. 12 is an illustration of an optical system of an embodiment of the concepts described herein with an ROIC having various fault diagnostics.

FIG. 12 is an illustration of an optical system 200 of an embodiment of the concepts described herein with an ROIC 205 having various fault diagnostics.

An example of a ROIC implementation with various fault diagnostics is described below in Table 2. Error comparison (such as illustrated in FIG. 11) may be achieved (a) within a digital controller of a single ROIC by comparing event data between two redundant paths, or (b) outside a system with multiple ROICs by comparing output data from two redundant ROICs. Error flags generated by any diagnostic or error comparison may be output on existing output data channels or output on a separate output channel specifically for error flags.

TABLE 2

ROIC Diagnostic Devices

| Diagnostic Device | Purpose |
| --- | --- |
| D01 | Photodiode diagnostic |
| D02 | Pixel Reference diagnostic |
| D03 | TDC Reference diagnostic |
| D04 | Temperature diagnostic |
| D05 | Clock and Timing Reference diagnostic |
| D06 | Pixel Timing diagnostic |
| D07 | Pixel Front End integrity diagnostic |
| D08 | Event Data integrity diagnostic |
| D09 | Pixel Event Memory integrity diagnostic |
| D10 | Output Data integrity diagnostic |
| D11 | Output Driver integrity diagnostic |
| D12 | Optical input integrity diagnostic |
| D13 | Power and Ground supply diagnostic |
| D14 | Error Comparison diagnostic between redundant paths |

Referring to FIG. 12, the optical system 200 includes the single optical device 203, a single optical transducer 205, and a single ROIC 207. The optical device 203 receives an optical input signal 201 and transmits the optical input signal 201 to the optical transducer 205. The optical device 203 includes an optical integrity diagnostic device D12.

The optical transducer 205 includes a plurality of photodiodes 209, 211, and 213. Each of the photodiodes 209, 211, and 213 has an input for receiving a bias voltage (VBIAS) and has an output. Each of the photodiodes 209, 211, and 213 includes a photodiode diagnostic device D01. The optical transducer 205 converts the optical input signal 201 to an electrical signal and transmits the electrical signal to the ROIC 207.

The ROIC 207 includes a voltage input (VDD), a ground connection (GND), a current reference (IREF), a clock input (CLK input), and an electrical timing signal (ET0). IREF is a reference current used to derive any bias current for any reference signal in the ROIC 207. ET0 is used for frame capture in the ROIC 207. The ROIC 207 also includes a power and ground supply diagnostic device D13, a global pixel references device 215, a global time to digital conversion (TDC) references device 217, a temperature sensor 219, a pixel front end array 221, a clock and timing synchronization device 223, a digital controller 225, and a data output channels device 227.

The global pixel references device 215 includes an input for receiving IREF, a pixel reference diagnostic device D02, and a plurality of outputs for providing reference signals. The global TDC references device 217 includes a TDC reference diagnostic device D03, and a plurality of outputs for providing TDC reference signals. The temperature sensor 219 includes a temperature diagnostic device D04.

The pixel front end array 221 includes a plurality of channels that match the number of photodiodes 209, 211, and 213 in the optical transducer 205. Each channel includes a gain stage 229, which has a first input connected to one of the outputs of the photodiodes 209, 211, and 213 in the optical transducer 205, an input connected to an output of the global pixel references device 215, and a plurality of pixel front end integrity diagnostic devices D07. Each channel also includes a comparator 231, a TDC device 233, an event memory device 235, and a pixel event memory integrity diagnostic device D09. Outputs of the gain stage 229 are connected to inputs of the comparator 231, outputs of the comparator 231 are connected to inputs of the TDC device 233, an output of the TDC device 233 is connected to the input of the event memory device 235, and the output of the event memory device 235 outputs event data. An event data integrity diagnostic device D08 monitors the event data outputs of the channels in the pixel front end array 221.

The clock and timing synchronization device 223 receives the clock input signal (CLK input) and the electrical timing signal (ET0), includes a clock and timing reference diagnostic device D05, and outputs a clock and timing synchronization signal.

The digital controller 225 includes an error comparator 237, receives the clock and timing synchronization signal from the clock and timing synchronization device 223, receives event data from each channel in the pixel front end array 221, and outputs a plurality of signals from the digital controller device 225 and the error comparator 237. The outputs of the digital controller device 225 are monitored by a plurality of pixel timing diagnostic devices D06. An output of the error comparator 237 is monitored by an output data integrity diagnostic device D10.

The data output channels device 227 includes a plurality of output driver devices 241 equal in number to the number of photodiodes 209, 211, and 213 in the optical transducer 205, receives inputs from the error comparator 237 and provides outputs for each of the output driver devices 241. The data output channels device 227 also includes a plurality of output driver integrity diagnostic devices D11.

The error comparator 237 receives error criteria from an error criteria function block (not shown) and includes an error comparison diagnostic device D14 for monitoring diagnostics between redundant paths. Using the error criteria, the error comparator 237 compares event data of the pixel front end array 221, determines if a fault has occurred in the processing of the optical input signal 201 by the ROIC 207, outputs a function of the event data as a sensor data output, and outputs an error flag signal. The error flag signal indicates whether a fault occurred in the processing of the optical input signal 201 by the ROIC 207. If no fault occurred then the sensor data output is the output of the ROIC 207. The error comparator 237 may be the comparator illustrated in FIG. 11.

Figure 13:
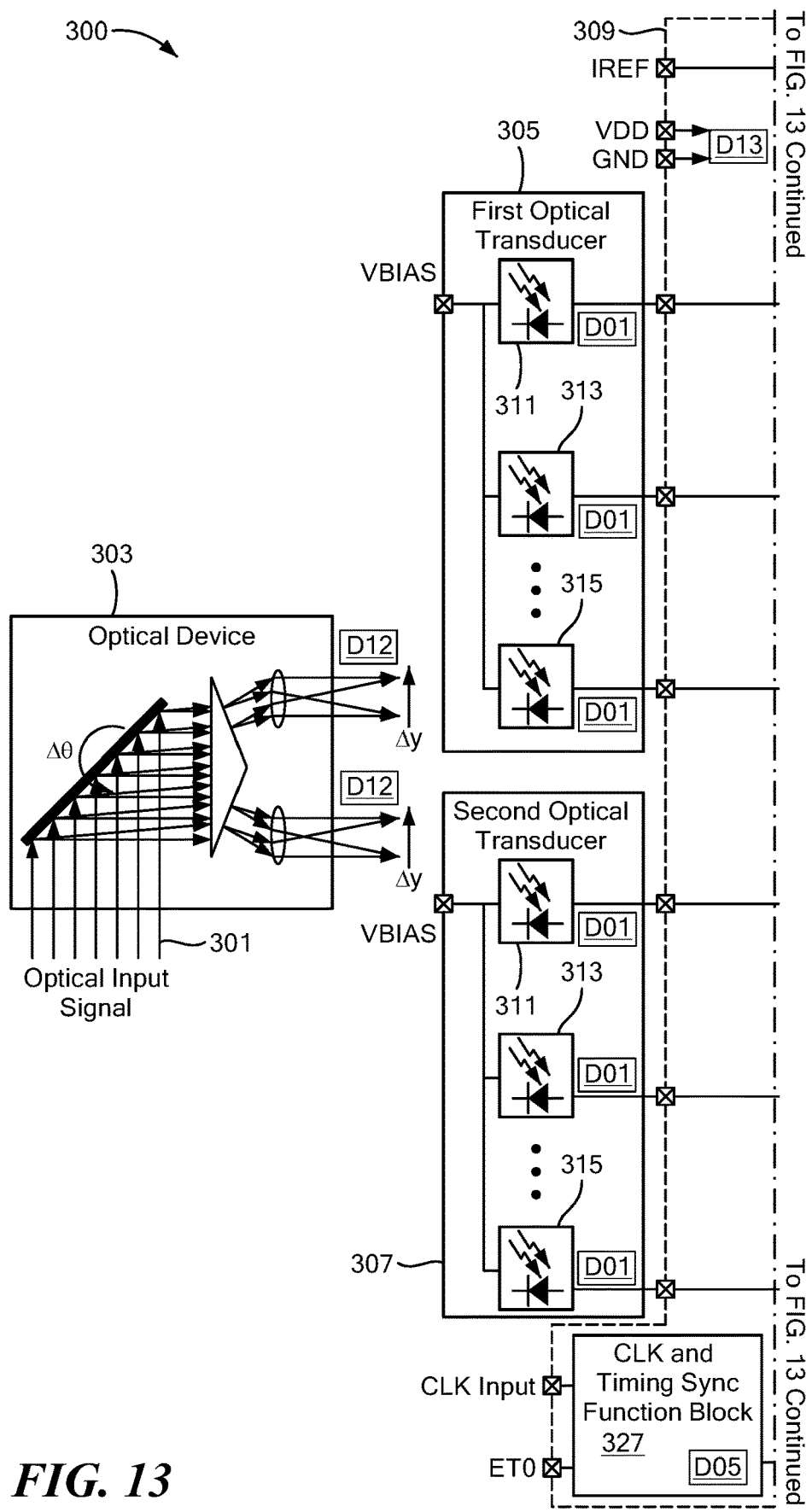
FIG. 13 is an illustration of an optical system of an embodiment of the concepts described herein with redundancy.
Figure 13:
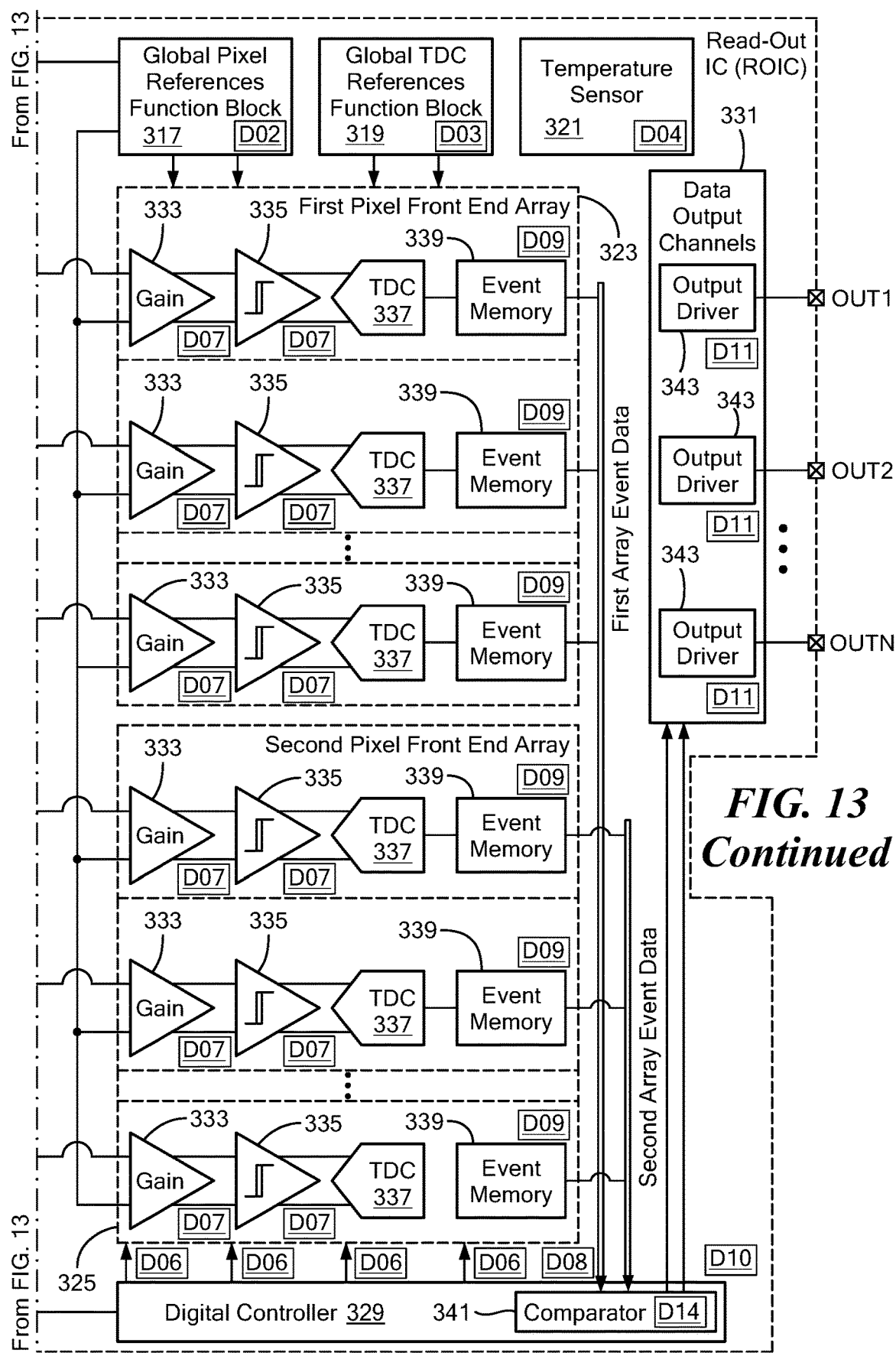

FIG. 13 is an illustration of an optical system 300 of an embodiment of the concepts described herein with redundancy.

Referring to FIG. 13, the optical system 300 includes an optical device 303, a first optical transducer 305, a second optical transducer 307, and an ROIC 309. The optical device 303 receives an optical input signal 301 and transmits the optical input signal 301 to the first optical transducer 305 and the second optical transducer 307. The optical system 300 includes an optical input integrity diagnostic device D12 at the output of the optical device 303 and a plurality of photodiode diagnostic devices D01 at the outputs of the first optical transducer 305 and the second optical transducer 307.

The first optical transducer 305 and the second optical transducer 307 each include a plurality of photodiodes 311, 313, and 315, where the second optical transducer 307 is redundant of the first optical transducer 305. Each of the photodiodes 311, 313, and 315 has an input for receiving a bias voltage (VBIAS) and has an output. Each of the first optical transducer 305 and the second optical transducer 307 converts the optical input signal 301 to an electrical signal and transmits the electrical signal to the ROIC 309.

The ROIC 309 includes a voltage input (VDD), a ground connection (GND), a current reference (IREF), a clock input (CLK input), and an electrical timing signal (ET0). IREF is a reference current used to derive any bias current for any reference signal in the ROIC 309. ET0 is used for frame capture in the ROIC 309. The ROIC 309 also includes a power and ground supply diagnostic device D13, a global pixel references device 317, a global TDC references device 319, a temperature sensor 321, a first pixel front end array 323, a second pixel front end array 325, a clock and timing synchronization device 327, a digital controller 329, and a data output channels device 331.

The global pixel references device 317 includes an input for receiving IREF, a pixel reference diagnostic device D02, and a plurality of outputs for providing reference signals. The global TDC references device 319 includes a TDC reference diagnostic device D03, and a plurality of outputs for providing TDC reference signals. The temperature sensor 321 includes a temperature diagnostic device D04.

The first pixel front end array 323 includes a plurality of channels that match the number of photodiodes 311, 313, and 315 in the first optical transducer 305. Each channel includes a gain stage 333, which has a first input connected to one of the outputs of the photodiodes 311, 313, and 315 in the first optical transducer 305, an input connected to an output of the global pixel references device 317, and a plurality of pixel front end integrity diagnostic devices D07. Each channel also includes a comparator 335, a TDC device 337, an event memory device 339, and a pixel event memory integrity diagnostic device D09. Outputs of the gain stage 333 are connected to inputs of the comparator 335, outputs of the comparator 335 are connected to inputs of the TDC device 337, an output of the TDC device 337 is connected to the input of the event memory device 339, and the output of the event memory device 339 outputs first event data.

The second pixel front end array 325 includes a plurality of channels that match the number of photodiodes 311, 313, and 315 in the second optical transducer 307. Each channel includes a gain stage 333, which has a first input connected to one of the outputs of the photodiodes 311, 313, and 315 in the second optical transducer 307, an input connected to an output of the global pixel references device 317, and a plurality of pixel front end integrity diagnostic devices D07. Each channel also includes a comparator 335, a TDC device 337, an event memory device 339, and a pixel event memory integrity diagnostic device D09. Outputs of the gain stage 333 are connected to inputs of the comparator 335, outputs of the comparator 335 are connected to inputs of the TDC device 337, an output of the TDC device 337 is connected to the input of the event memory device 339, and the output of the event memory device 339 outputs second event data.

The clock and timing synchronization device 327 receives the clock input signal (CLK input) and the electrical timing signal (ET0), includes a clock and timing reference diagnostic device D05, and outputs a clock and timing synchronization signal.

The digital controller 329 includes an error comparator 341, receives the clock and timing synchronization signal from the clock and timing synchronization device 327, receives event data from each channel in the first pixel front end array 323 and the second pixel front end array 325, and outputs a plurality of signals from the digital controller device 329 and the error comparator 341. The outputs of the digital controller device 329 are monitored by a plurality of pixel timing diagnostic devices D06. An output of the error comparator 341 is monitored by an output data integrity diagnostic device D10.

The data output channels device 331 includes a plurality of output driver devices 343 equal in number to the number of photodiodes 311, 313, and 315 in the first optical transducer 305, receives inputs from the error comparator 341 and provides outputs for each of the output driver devices 343. The data output channels device 331 also includes a plurality of output driver integrity diagnostic devices D11.

The error comparator 341 receives error criteria from an error criteria function block (not shown) and includes an event data integrity diagnostic device D08 for monitoring the event data outputs of the channels in the first pixel front end array 323 and the second pixel front end array 325 and an error comparison diagnostic device D14 for determining diagnostics between redundant paths. Using the error criteria, the error comparator 341 compares first event data of the first pixel front end array 323 and second event data of the second pixel front end array 325, determines if a fault has occurred in the processing of the optical input signal 301 by the ROIC 309, outputs a function of the first event data and the second event data as a sensor data output, and outputs an error flag signal. The error flag signal indicates whether a fault occurred in the processing of the optical input signal 301 by the ROIC 309. If no fault occurred then the sensor data output, which may be the same as the first event data, is the output of the ROIC 309. The error comparator 341 may be the comparator illustrated in FIG. 11.

The second optical transducer 307 is redundant of the first optical transducer 305 and is connected to a monolithic ROIC 309, which includes a first pixel front end array 323 and a second pixel front end array 325, that is redundant of the first pixel front end array 323, for sensing the paths of the first optical transducer 305 and the second optical transducer 307. Data from both paths is sent into the error comparator 341. The optical system 300 is an implementation which used an optical splitting technique in the optical device 303. Optical translation using a rotating reflector is implemented and sent into an optical splitter implemented with transmission grating. Thus, the optical input signal is split and translated across two redundant arrays simultaneously.

The optical system 300 may be implemented with many of the other techniques described above and may include redundancy in other parts of the ROIC 309. For example, the global pixel references device 317 may be made redundant, or the ROIC 309 may be implemented as two separate integrated circuits (ICs) for full redundancy and the error comparator 341 may be outside of the two ROICs. The optical system 300 may also be implemented with any presently known, or later developed, beam-splitting technique.

Figure 14:
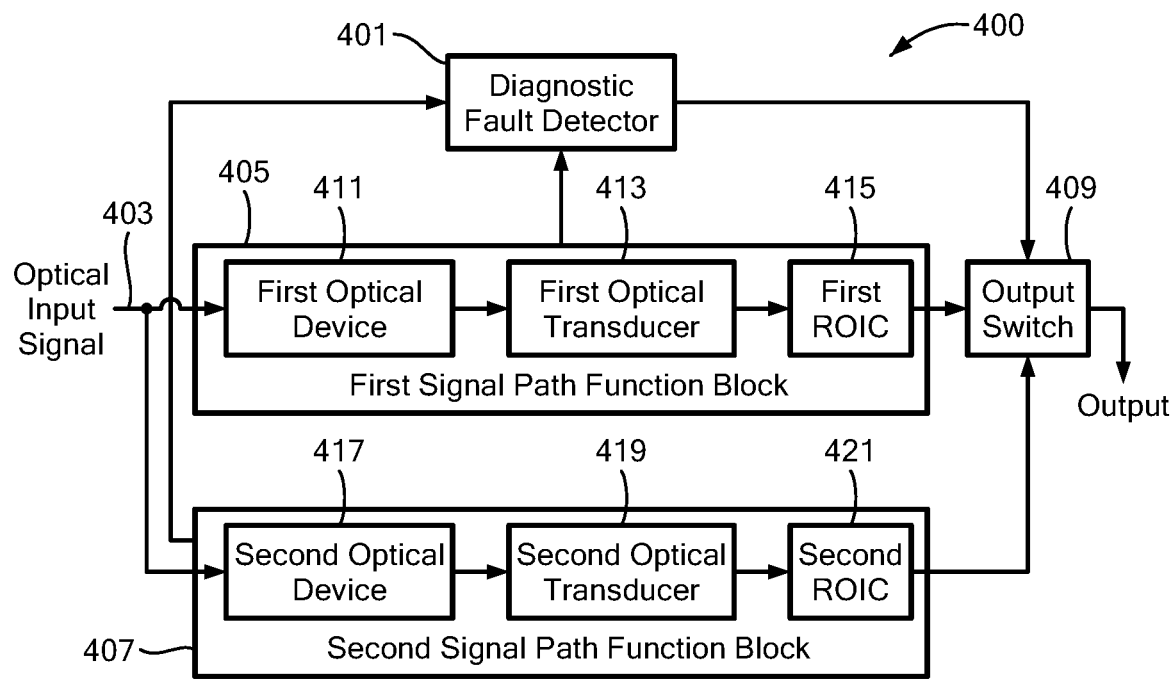
FIG. 14 is an illustration of an optical system of an embodiment of the concepts described herein with redundancy built for a purpose of backup when a primary signal path is found to have an error/fault.

FIG. 14 is an illustration of an optical system 400 of an embodiment of the concepts described herein with redundancy built for a purpose of backup when a primary (e.g., first) signal path is found to have an error/fault. In error-free operation, the optical system 400 uses the primary signal path. When an error occurs in the primary signal path, the optical system 400 switches to the backup (e.g., second) signal path.

Referring to FIG. 14, the optical system 400 includes a diagnostic fault detector 401, a first signal path function block 405, a second (e.g., backup) signal path function block 407, and an output switch 409.

The first (e.g., primary) signal path function block 405 includes a first optical device 411, a first optical transducer 413, and a first ROIC 415. The first optical device 411 receives an optical input signal 403 and transmits the optical input signal 403 to the first optical transducer 413. The first optical transducer 413 converts the optical input signal 403 to an electrical signal and transmits the electrical signal to the first ROIC 415. The first ROIC 415 processes the electrical signal and transmits the processed electrical signal to the output switch 409. The first optical device 411 may be an optical splitter, an optical steerer, or any other suitable optical device.

The second (e.g., backup) signal path function block 407 is redundant of the first signal path function block 405. That is, the second signal path function block 407 includes a second optical device 417 identical to the first optical device 411, a second optical transducer 419 identical to the first optical transducer 415, and a second ROIC 421 identical to the first ROIC 415. The second optical device 417 receives the optical input signal 403 and transmits the optical input signal 403 to the second optical transducer 419. The second optical transducer 419 converts the optical input signal 403 to an electrical signal and transmits the electrical signal to the second ROIC 421. The second ROIC 421 processes the electrical signal in the same manner as the first ROIC 415 and transmits the processed electrical signal to the output switch. The second optical device 417 may be an optical splitter, an optical steerer, or any other suitable optical device.

The diagnostic fault detector 401 receives error criteria from an error criteria function block (not shown), receives the outputs of the first ROIC 415 and the second ROIC 421 from the first signal path function block 405 and the second signal path function block 407, respectively, and outputs an error signal to the output switch 409. Using the error criteria, the diagnostic fault detector 401 compares the outputs of the first ROIC 415 and the second ROIC 421, determines if an error occurred in the processing of the optical input signal 403 by the first signal path function block 405. If no error occurred then the diagnostic fault detector 401 transmits a signal to the output switch 409 to output the output of the first ROIC 421. If an error occurred then the diagnostic fault detector 401 transmits a signal to the output switch 409 to output the output of the second ROIC 421. In an alternate embodiment, an additional switch is inserted between the optical input signal 403 and the first optical device 411 and the second optical device 411, where the additional switch is under the control of the diagnostic fault detector 401. Initially, the additional switch only allows the optical input signal 403 to be transmitted to the first optical device 411. Only if an error occurs in the processing of the optical input signal 403 by the first signal path function block 405 does the additional switch transmit the optical input signal 403 to only the second signal path function block 407. Thus, only one of the first signal path function block 405 and the second signal path function block 407 is on at any time.

Figure 15:
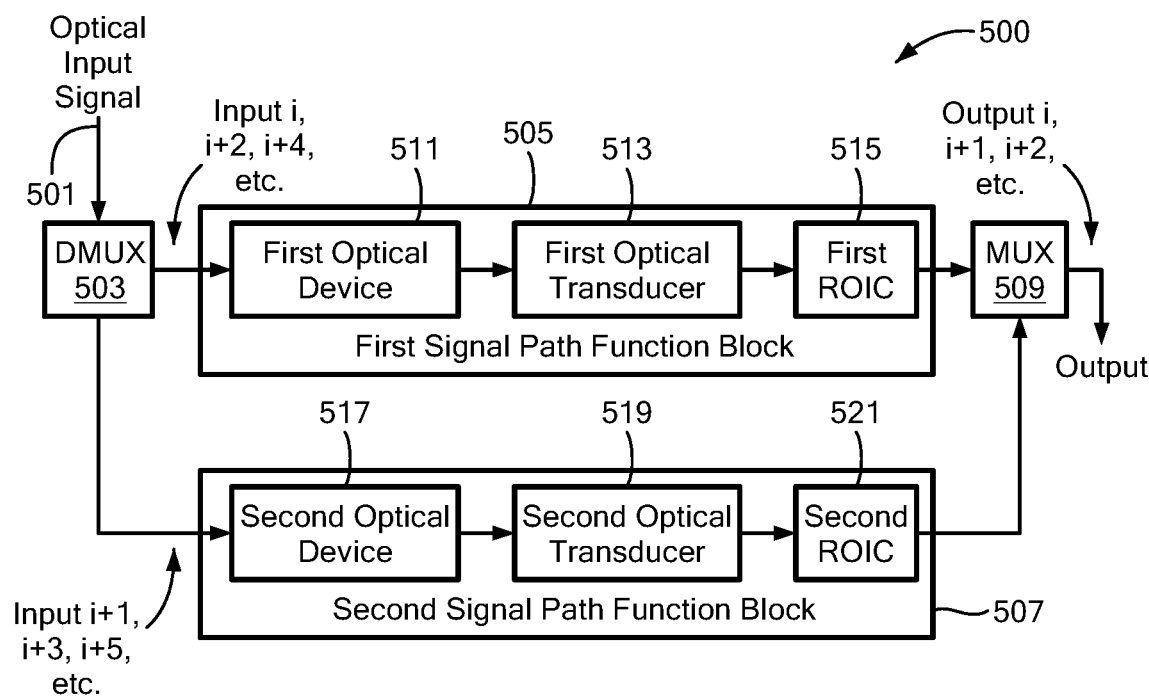
FIG. 15 is an illustration of an optical system of an embodiment of the concepts described herein with redundancy built for the purpose of extending product bandwidth performance.

FIG. 15 is an illustration of an optical system 500 of an embodiment of the concepts described herein with redundancy for the purpose of extending product bandwidth performance. During typical operation, an optical input signal is segmented, each segment is processing by separate signal paths, where the signal paths are redundant of each other, and the results of the signal paths are combined at an output. Total bandwidth limit is a bandwidth limit of the individual signal processing paths times the number of processing signal paths.

Referring to FIG. 15, the optical system 500 includes a demultiplexer (DMUX) 503, a first signal path function block 505, a second signal path function block 507, and a multiplexer (MUX) 509.

The demultiplexer 503 receives an optical input signal 501 and divides the optical input signal 501 into a first segment and a second segment, where the first segment includes parts of the optical input signal 401 that are not included in the second segment. The first segment is output on a first output of the demultiplexer 503 and the second segment is output on a second output of the demultiplexer 503.

The first signal path function block 505 includes a first optical device 511, a first optical transducer 513, and a first ROIC 515. The first optical device 511 receives the first segment of the optical input signal 501 and transmits the first segment of the optical input signal 501 to the first optical transducer 513. The first optical transducer 513 converts the first segment of the optical input signal 501 to an electrical signal and transmits the electrical signal to the first ROIC 515. The first ROIC 515 processes the electrical signal and transmits the processed electrical signal to the multiplexer 509. The first optical device 511 may be an optical splitter, an optical steerer, or any other suitable optical device.

The second signal path function block 507 is redundant, component-wise, of the first signal path function block 505, but processes a different segment (e.g., the second segment) of the optical input signal 501. That is, the second signal path function block 507 includes a second optical device 517 identical to the first optical device 511, a second optical transducer 519 identical to the first optical transducer 515, and a second ROIC 521 identical to the first ROIC 515. The second optical device 517 receives the second segment of the optical input signal 501 and transmits the second segment of the optical input signal 501 to the second optical transducer 519. The second optical transducer 519 converts the second segment of the optical input signal 501 to an electrical signal and transmits the electrical signal to the second ROIC 521. The second ROIC 521 processes the electrical signal in the same manner as the first ROIC 515 and transmits the processed electrical signal to the multiplexer 509. The multiplexer 509 outputs the combination of the outputs of the first ROIC 515 and the second ROIC 521. The second optical device 517 may be an optical splitter, an optical steerer, or any other suitable optical device.

Figure 16:
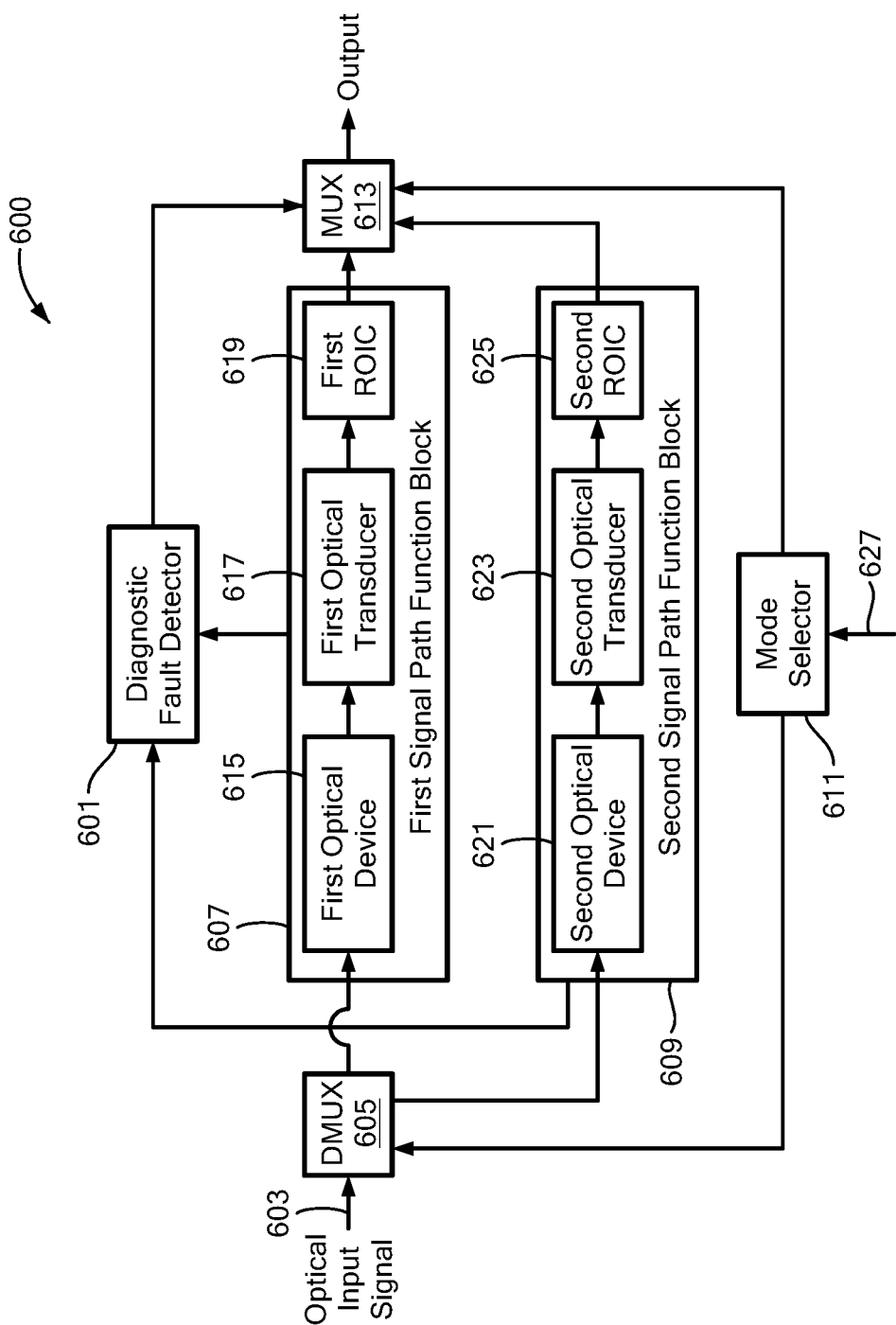
FIG. 16 is an illustration of an optical system of an embodiment of the concepts described herein with hybrid redundancy to switch between a redundant mode and a workload-sharing mode.

FIG. 16 is an illustration of an optical system 600 of an embodiment of the concepts described herein with hybrid redundancy to switch between a redundant/comparison mode and a workload-sharing mode.

Referring to FIG. 16, the optical system 600 includes a diagnostic fault detector 601, a demultiplexer (DMUX) 605, a first signal path function block 607, a second signal path function block 609, a mode selector 611, and a multiplexer 613.

The demultiplexer 605 receives an optical input signal 603 and divides the optical input signal 603 into a first segment and a second segment. The mode selector 611 determines the form of the first segment and the second segment. The mode selector 611 controls the demultiplexer 605 to output the first segment and the second segment, where the first segment is approximately identical to the second segment in the redundant/comparison mode (i.e., where the first signal path function block 607 and the second signal path function block 609 both process the same optical signal). The mode selector 611 may also instruct the demultiplexer 605 to output the first segment and the second segment, where the first segment includes parts of the optical input signal 603 that are not included in the second segment in the workload-sharing mode (i.e., where the first signal path function block 607 and the second signal path function block 609 process different optical signals). The first segment is output on a first output of the demultiplexer 605 and the second segment is output on a second output of the demultiplexer 605.

The first signal path function block 607 includes a first optical device 615, a first optical transducer 617, and a first ROIC 619. The first optical device 615 receives the first segment of the optical input signal 603 and transmits the first segment to the first optical transducer 617. The first optical transducer 617 converts the first segment of the optical input signal 603 to an electrical signal and transmits the electrical signal to the first ROIC 619. The first ROIC 619 processes the electrical signal and transmits the processed electrical signal to the multiplexer 613. The first optical device 615 may be an optical splitter, an optical steerer, or any other suitable optical device.

The second signal path function block 609 is redundant of the first signal path function block 607. That is, the second signal path function block 609 includes a second optical device 621 identical to the first optical device 615, a second optical transducer 623 identical to the first optical transducer 617, and a second ROIC 625 identical to the first ROIC 619. The second optical device 621 receives the second segment of the optical input signal 603 and transmits the second segment of the optical input signal 603 to the second optical transducer 623. The second optical transducer 623 converts the second segment of the optical input signal 603 to an electrical signal and transmits the electrical signal to the second ROIC 625. The second ROIC 625 processes the electrical signal in the same manner as the first ROIC 619 and transmits the processed electrical signal to the multiplexer 613. The second optical device 621 may be an optical splitter, an optical steerer, or any other suitable optical device.

The diagnostic fault detector 601 receives error criteria from an error criteria function block (not shown), receives the outputs of the first ROIC 619 and the second ROIC 625 from the first signal path function block 607 and the second signal path function block 609, respectively, and outputs an error signal to the multiplexer 613. Using the error criteria, the diagnostic fault detector 601 compares the outputs of the first ROIC 619 and the second ROIC 625, determines if a fault has occurred in the processing of the first segment of the first optical input signal 603 by the first signal path function block 607. If no error occurred while in the redundant/comparison mode then the diagnostic fault detector 601 transmits a signal to the multiplexer 613 to output the output of the first ROIC 619. If an error occurred while in the redundant/comparison mode then the diagnostic fault detector 601 transmits a signal to the multiplexer 613 to output an output that is a function of the first ROIC 619 and the second ROIC 625 that is determined to be error free.

In an alternate embodiment in the comparison mode, switches are inserted between the outputs of the demultiplexer 605 and the first optical device 615 and the second optical device 621, respectively, where the switches are under the control of the diagnostic fault detector 601. The additional switches only allow the first segment of the optical input signal 603 to be transmitted to the first optical device 615 when no fault has occurred in the processing of the first segment of the optical input signal 603 by the first signal path function block 607 and only allow the second segment of the optical input signal 603 to be transmitted to the second optical device 621 when a fault is detected in the processing of the first segment of the optical input signal 603 by the first signal path function block 607. Only if a fault occurs in the processing of the optical input signal 603 by the first signal path function block 405 does the additional switches transmit the second segment of the optical input signal 603 to only the second signal path function block 609. Thus, only one of the first signal path function block 607 and the second signal path function block 609 is on at any time.

In the workload-sharing mode, the diagnostic fault detector 601 controls the multiplexer 613 to output a combination of the outputs of the first ROIC 619 and the second ROIC 625.

The mode selector 611 controls the optical system 600 to be in either the redundant/comparison mode or the workload-sharing mode under control of an input signal 627. In the redundant/comparison mode, the mode selector 611 controls the demultiplexer 605 to make the first segment and the second segment of the optical input signal 603 the same and controls the multiplexer to output only the output of the first ROIC 619 or an function of the outputs of the first ROIC 619 and the second ROIC 625 based on whether or not a fault is detected by the diagnostic fault detector 601, respectively.

In the workload-sharing mode, the mode selector 611 controls the demultiplexer 605 to make the first segment and the second segment of the optical input signal 603 different and controls the multiplexer 613 to output a combination of the outputs of the first ROIC 619 and the second ROIC 625.

The mode selector 627 is used to switch between the redundant/comparison mode and the workload-sharing. The mode selector 611 may be controlled by a manual input 627 to the optical system 600 or an input driven by a monitoring system (e.g., if the input frequency is low enough, use redundancy for diagnostic coverage as shown in FIG. 12, but if the input frequency exceeds the bandwidth of an individual channel then switch to an extended bandwidth operation as shown in FIG. 13).

Figure 17:
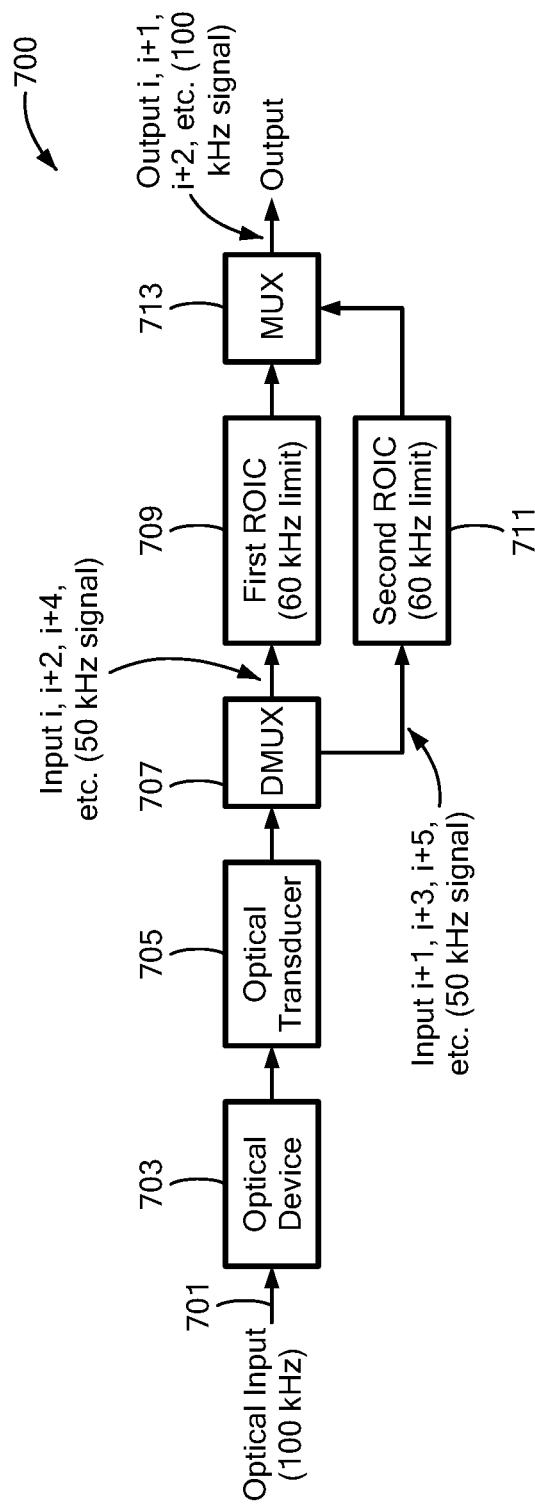
FIG. 17 is an illustration of an optical system of an embodiment of the concepts described herein with bandwidth sharing.

FIG. 17 is an illustration of an optical system 700 of an embodiment of the concepts described herein with bandwidth sharing.

Referring to FIG. 17, the optical system 700 includes an optical device 703, an optical transducer 705, a demultiplexer (DMUX) 707, a first ROIC 709, a second ROIC 711, and a multiplexer (MUX) 713. The optical device 703 is a high-frequency optical device and may be an optical splitter, an optical steerer, or any other suitable optical device.

In an embodiment, an individual signal processing path may be bandwidth limited by the first ROIC 709 and the second ROIC 711, respectively, to an input signal of 60 kHz while the optical system 700 receives a 100 kHz optical input signal 701 and outputs a 100 kHz optical signal.

The optical device 703 receives the optical input signal 701 and transmits the optical input signal 701 to the optical transducer 705.

The demultiplexer 707 is a high-frequency switch that switches consecutive inputs across the first ROIC 709 and the second ROIC 711. Each signal path received by the first ROIC 709 and the second ROIC 711, respectively, receives an observed input of 50 kHz (within the bandwidth limitation of the first ROIC 709 and the second ROIC 711, respectively).

The multiplexer 713 is a high-frequency multiplexer that combines the outputs of the first ROIC 709 and the second ROIC 711 into a single 100 kHz output signal.

The optical transducer 707 converts the optical input signal 701 as received from the optical device 703 to an electrical signal and transmits the electrical signal to the demultiplexer 707.

The demultiplexer 707 receives electrical signal from the optical transducer 705 and divides the electrical signal into a first segment that is half the frequency (e.g., 50 kHz) of the electrical signal (e.g., 100 kHz) and a second segment that is half the frequency (e.g., 50 kHz) of the electrical signal (e.g., 100 kHz), where the first segment includes parts of the optical input signal 701 that are not included in the second segment. The first segment is output on a first output of the demultiplexer 707 and the second segment is output on a second output of the demultiplexer 707.

The first ROIC 709 receives the first segment from the demultiplexer 707, where the first ROIC 709 has an upper frequency limit (e.g., 60 kHz) for processing signals that is higher than the frequency of the first segment (e.g., 50 kHz). The second ROIC 711 receives the second segment from the demultiplexer 707, where the second ROIC 711 has an upper frequency limit (e.g., 60 kHz) for processing signals that is higher than the frequency of the second segment (e.g., 50 kHz).

The multiplexer 613 receives the outputs of the first ROIC 709 and the second ROIC 711, respectively, combines the outputs of the first ROIC 709 and the second ROIC 711, and outputs the result of the combination, where the frequency of the combination (e.g., 100 kHz) is twice that of the output of the first ROIC 709 (e.g., 50 kHz) and the output of the second ROIC 711 (e.g., 50 kHz).

Various embodiments of the concepts, systems, devices, structures and techniques sought to be protected are described herein with reference to the related drawings. As noted above, in embodiments, the concepts and features described herein may be embodied in a hydraulic-pneumatic actuator. Alternative embodiments can be devised without departing from the scope of the concepts, systems, devices, structures and techniques described herein.

It is noted that various connections and positional relationships (e.g., over, below, adjacent, etc.) are set forth between elements in the above description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description herein, terms such as "upper," "lower," "right," "left," "vertical," "horizontal, "top," "bottom," (to name but a few examples) and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements. Such terms are sometimes referred to as directional or positional terms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. An optical system configured to output redundant outputs, comprising:
    at least one optical device configured to receive an optical signal;
    at least one optical transducer, wherein each at least one optical transducer is configured to receive the optical signal from the at least one optical device and convert the optical signal to an electrical signal; and
    at least one electronic device configured to receive each electrical signal and output the redundant outputs,
        wherein each of the at least one optical device comprises an optical steerer is configured to steer the optical signal to each of the at least one optical transducer one at a time, wherein the optical steerer has a mirrored surface, and
        wherein the at least one electronic device comprises a read-out-integrated circuit (ROIC) configured to perform redundant signal processing of outputs of each of the at least one optical transducers.

2. The optical system of claim 1, wherein each of the at least one optical transducer comprises a plurality of optical elements, and wherein an output of each of the at least one optical transducer is produced by one of a plurality of signal paths through the at least one optical transducer.

3. The optical system of claim 1, wherein the optical steerer is one of a micro-electromechanical system (MEMS) mirror, a rotational mirror, and a shifting prism.

4. The optical system of claim 3, wherein the redundant signal processing is one of homogeneous redundant signal processing and heterogeneous redundant signal processing, wherein homogeneous redundant signal processing is performing a same function using a same architecture, and wherein heterogeneous redundant signal processing is performing one of the same function using different architectures and different functions using different architectures.

5. The optical system of claim 1, wherein the ROIC is configured to perform signal processing, and wherein each of at least one sub-mount device is a breakout circuit that is not configured to perform signal processing.

6. The optical system of claim 5, wherein each of the at least one ROIC is further configured to determine if a fault occurs in the redundant outputs and, if so, to reduce the two redundant outputs to one output.

7. The optical system of claim 5, wherein the at least one ROIC is further configured to be one of multiple integrated circuits and one integrated circuit, wherein each of the multiple integrated circuits outputs one of the redundant outputs, and wherein the one integrated circuit outputs all of the redundant outputs.

8. The optical system of claim 1, wherein the at least one optical device is one optical device, the at least one optical transducer is a first optical transducer and a second optical transducer, and the at least one electronic device is one read-out-integrated-circuit (ROIC) having two redundant paths for outputting the redundant outputs.

9. The optical system of claim 8, wherein the at least one optical device is one optical device, the at least one optical transducer is a first optical transducer and a second optical transducer, the at least one electronic device is an ROIC having a first processing path, a second processing path that is redundant of the first processing path, and a comparator,
    wherein the one optical device is configured to receive the optical signal,
    wherein the first optical transducer is configured to receive the optical signal from the one optical device and convert the optical signal to a first electrical signal,
    wherein the second optical transducer is configured to receive the optical signal from the one optical device and convert the optical signal to a second electrical signal,
    wherein the ROIC is configured to receive the first electrical signal and the second electrical signal, process the first electrical signal by the first processing path, process the second electrical by the second processing path, and compare the processed first electrical signal and the processed second electrical signal to determine if there is an error in either of the processed first electrical signal and the processed second electrical signal,
and further comprising:

an error criteria function block configured to provide error criteria concerning the processed first electrical signal and the processed second electrical signal;

wherein the comparator is configured to receive the error criteria, the processed first electrical signal, and the processed second electrical signal; determine if an error occurred in one of the processed first electrical signal and the processed second electrical signal; if no error occurred, the ROIC outputs at least one of the processed first electrical signal and the processed second electrical signal; and if an error occurred, the ROIC outputs an error flag and a function of the processed first electrical signal and the processed second electrical signal that is determined to be error free.

10. The optical system of claim 8, wherein the at least one optical device is one optical device comprising a first diagnostics function block configured to provide diagnostics on the one optical device, the at least one optical transducer is a first optical transducer comprising a second diagnostics function block configured to provide diagnostics on the first optical transducer and a second optical transducer comprising a third diagnostics function block configured to provide diagnostics on the second optical transducer, the at least one electronic device is an ROIC having a first processing path, a second processing path that is redundant of the first processing path and comprising a fourth diagnostics function block configured to provide diagnostics on the ROIC, a global pixel reference function block comprising a fifth diagnostics function block configured to provide diagnostics on the global pixel reference function block, a global time-to-digital converter (TDC) references function block comprising a sixth diagnostics function block configured to provide diagnostics on the global TDC references function block, a temperature sensor comprising a seventh diagnostics function block configured to provide diagnostics on the temperature sensor, a clock and timing synchronization function block comprising an eighth diagnostics function block configured to provide diagnostics on the clock and timing synchronization function block, a digital converter comprising a comparator and a ninth diagnostics function block configured to provide diagnostics on the comparator, and a data output channels function block comprising a tenth diagnostics function block configured to provide diagnostics on the data output channels function block, wherein the one optical device is configured to receive the optical signal, wherein the first optical transducer is configured to receive the optical signal from the one optical device and convert the optical signal to a first electrical signal, wherein the second optical transducer is configured to receive the optical signal from the one optical device and convert the optical signal to a second electrical signal, wherein the ROIC is configured to receive the first electrical signal and the second electrical signal, process the first electrical signal by the first processing path, process the second electrical by the second processing path, and compare the processed first electrical signal and the processed second electrical signal to determine if there is an error in either of the processed first electrical signal and the processed second electrical signal, and further comprising:

an error criteria function block configured to provide error criteria concerning the processed first electrical signal and the processed second electrical signal;

wherein the comparator is configured to receive the error criteria, the processed first electrical signal, the processed second electrical signal, and diagnostics from the first through tenth diagnostic function blocks; determine if an error occurred in one of the processed first electrical signal and the processed second electrical signal; if no error occurred, the ROIC outputs at least one of the processed first electrical signal and the processed second electrical signal via the data output channels function block; and if an error occurred, the ROIC outputs an error flag and a function of the processed first electrical signal and the processed second electrical signal that is determined to be error free via the data output channels function block.

11. The optical system of claim 10, wherein the comparator comprises:

a subtractor configured to receive an output of the first processing path of the ROIC, receive an output of the second processing path of the ROIC, and subtract the output of the second processing path of the ROIC from the output of the first processing path of the ROIC;

a second comparator configured to compare the output of the subtractor to an error tolerance;

a combinatorial logic gate configured to perform a combinatorial logical operation on the output of the second comparator, at least one diagnostic from the first through tenth diagnostic function blocks, and to output an error flag when an error occurs; and an output data processor configured to receive the output of the first processing path of the ROIC, the output of the second processing path of the ROIC, and the output of the combinatorial logic gate, and a function of the outputs of the first processing path of the ROIC and the output of the second processing path of the ROIC that is determined to be error free.

12. The optical system of claim 1, wherein the at least one optical device is one optical device, the at least one optical transducer is a first optical transducer and a second optical transducer, and the at least one electronic device is a first read-out-integrated-circuit (ROIC) and a second ROIC.

13. The optical system of claim 1, wherein the at least one optical device is a first optical device and a second optical device, the at least one optical transducer is a first optical transducer and a second optical transducer, the at least one electronic device is a first read-out-integrated-circuit (ROIC) and a second ROIC, wherein the first optical device is configured to receive the optical signal, wherein the first optical transducer is configured to receive the optical signal from the first optical device and convert the optical signal to a first electrical signal, wherein the first ROIC is configured to receive the first electrical signal and process the first electrical signal, wherein the second optical device is configured to receive the optical signal, wherein the second optical transducer is configured to receive the optical signal from the second optical device and convert the optical signal to a second electrical signal, wherein the second ROIC is configured to receive the second electrical signal and process the second electrical signal, and further comprising:

an error criteria function block configured to provide error criteria concerning the processed first electrical signal and the processed second electrical signal; and a comparator configured to receive the error criteria, the processed first electrical signal, and the processed second electrical signal; determine if an error occurred in one of the processed first electrical signal and the processed second electrical signal; if no error occurred, output at least one of the processed first electrical signal and the processed second electrical signal; and if an error occurred, output an error flag and a function of the processed first electrical signal and the processed second electrical signal that is determined to be error free.

14. The optical system of claim 1, wherein the at least one optical device is a first optical device and a second optical device, the at least one optical transducer is a first optical transducer and a second optical transducer, the at least one electronic device is a first read-out-integrated-circuit (ROIC) and a second ROIC,
wherein the first optical device is configured to receive the optical signal,
wherein the first optical transducer is configured to receive the optical signal from the first optical device and convert the optical signal to a first electrical signal,
wherein the first ROIC is configured to receive the first electrical signal and process the first electrical signal,
wherein the second optical device is configured to receive the optical signal,
wherein the second optical transducer is configured to receive the optical signal from the second optical device and convert the optical signal to a second electrical signal,
wherein the second ROIC is configured to receive the second electrical signal and process the second electrical signal,
and further comprising:
a diagnostic fault detector configured to receive the processed first electrical signal and the processed second electrical signal, determines if an error occurred in either of the processed first electrical signal and the processed second electrical signal, and outputs a control signal; and
a switch configured to receive the processed first electrical signal, the processed second electrical signal, and the control signal, output the processed first electrical signal if no error occurred, and output a function of the first processed electrical signal and the processed second electrical signal that is error free when an error occurred.

15. The optical system of claim 1, wherein the at least one optical device is a first optical device and a second optical device, the at least one optical transducer is a first optical transducer and a second optical transducer, the at least one electronic device is a first read-out-integrated-circuit (ROIC) and a second ROIC,
and further comprising:
a demultiplexer configured to receive the optical signal and segment the optical signal into a first segment and a second segment, wherein the second segment does not contain any portion of the optical segment contained in the first segment; and
a multiplexer;
wherein the first optical device is configured to receive the first segment,
wherein the first optical transducer is configured to receive the first segment from the first optical device and convert the first segment to a first electrical signal,
wherein the first ROIC is configured to receive the first electrical signal and process the first electrical signal,
wherein the second optical device is configured to receive the second segment,
wherein the second optical transducer is configured to receive the second segment from the second optical device and convert the second segment to a second electrical signal,
wherein the second ROIC is configured to receive the second electrical signal and process the second electrical signal, and
wherein the multiplexer is configured to receive the processed first electrical signal and the processed second electrical signal, and outputs a combination of the processed first electrical signal and the processed second electrical signal.

16. The optical system of claim 1, wherein the at least one optical device is a first optical device and a second optical device, the at least one optical transducer is a first optical transducer and a second optical transducer, the at least one electronic device is a first read-out-integrated-circuit (ROIC) and a second ROIC,
and further comprising:
a diagnostic fault detector;
a mode selector configured to output one of a signal indicating a redundant/comparison mode and a workload-sharing mode under control of one of an input signal and a determination of the optical signal;
a demultiplexer; and
a multiplexer,
wherein the demultiplexer is configured to receive the optical signal and segment the optical signal into a first segment and a second segment under control of the mode selector, wherein the first segment and the second segment are approximately identical when the mode selector outputs the signal indicating the redundant/comparison mode, and wherein the second segment does not contain any portion of the optical segment contained in the first segment when the mode selector outputs the signal indicating the workload-sharing mode;
wherein the first optical device is configured to receive the first segment,
wherein the first optical transducer is configured to receive the first segment from the first optical device and convert the first segment to a first electrical signal,
wherein the first ROIC is configured to receive the first electrical signal and process the first electrical signal,
wherein the second optical device is configured to receive the second segment,
wherein the second optical transducer is configured to receive the second segment from the second optical device and convert the second segment to a second electrical signal,
wherein the second ROIC is configured to receive the second electrical signal and process the second electrical signal,
wherein the diagnostic fault detector is configured to receive the processed first electrical signal and the processed second electrical signal, and output an error flag for use during the redundant/comparison mode; and
wherein the multiplexer is configured to receive the processed first electrical signal, the processed second electrical signal, the signal from the mode selector, and the error flag, when in the redundant/comparison mode, output the processed first electrical signal if no error occurred, and output a function of the first processed electrical signal and the processed second electrical signal that is error free when an error occurred, and, when in the workload-sharing mode, output a combination of the processed first electrical signal and the processed second electrical signal.

17. An optical system configured to output redundant outputs, comprising:
at least one optical device configured to receive an optical signal;
at least one optical transducer, wherein each at least one optical transducer is configured to receive the optical signal from the at least one optical device and convert the optical signal to an electrical signal; and
at least one electronic device configured to receive each electrical signal and output the redundant outputs,
wherein each of the at least one optical devices comprises an optical splitter configured to transmit the optical signal to each of the at least one optical transducer, and
wherein the at least one electronic device comprises a read-out-integrated circuit (ROIC) configured to perform redundant signal processing.

18. The optical system of claim 17, wherein each of the at least one ROIC is further configured to perform redundant signal processing.

19. An optical system configured to output redundant outputs, comprising:
at least one optical device configured to receive an optical signal;
at least one optical transducer, wherein each at least one optical transducer is configured to receive the optical signal from the at least one optical device and convert the optical signal to an electrical signal; and
at least one electronic device configured to receive each electrical signal and output the redundant outputs,
wherein the at least one optical device is one optical device, the at least one optical transducer is a first optical transducer and a second optical transducer, the at least one electronic device is a first read-out-integrated-circuit (ROIC) and a second ROIC,
wherein the one optical device is configured to receive the optical signal,
wherein the first optical transducer is configured to receive the optical signal from the one optical device and convert the optical signal to a first electrical signal,
wherein the first ROIC is configured to receive the first electrical signal and process the first electrical signal,
wherein the second optical transducer is configured to receive the optical signal from the one optical device and convert the optical signal to a second electrical signal,
wherein the second ROIC is configured to receive the second electrical signal and process the second electrical signal,
and further comprising:
an error criteria function block configured to provide error criteria concerning the processed first electrical signal and the processed second electrical signal; and
a comparator configured to receive the error criteria, the processed first electrical signal, and the processed second electrical signal; determine if an error occurred in one of the processed first electrical signal and the processed second electrical signal; if no error occurred, output at least one of the processed first electrical signal and the processed second electrical signal; and if an error occurred, output an error flag and a function of the processed first electrical signal and the processed second electrical signal that is determined to be error free.

20. A method of configuring an optical system to output redundant outputs, comprising:
configuring at least one optical device to receive an optical signal;
configuring each of at least one optical transducer to receive the optical signal from the at least one optical device and convert the optical signal to an electrical signal; and
configuring at least one electronic device to receive each electrical signal and output the redundant outputs,
wherein each of the at least one optical device comprises an optical steerer configured to steer the optical signal to each of the at least one optical transducer one at a time, wherein the optical steerer has a mirrored surface, and
wherein the at least one electronic device comprises a read-out-integrated circuit (ROIC) configured to perform redundant signal processing of outputs of each of the at least one optical transducers.

21. The method of claim 20, wherein each of the at least one optical transducer comprises a plurality of optical elements, and wherein an output of each of the at least one optical transducer is produced by one of a plurality of signal paths through the at least one optical transducer.

22. The method of claim 20, wherein the optical steerer is one of a micro-electromechanical system (MEMS) mirror, a rotational mirror, and a shifting prism.

23. The method of claim 22, wherein the redundant signal processing is one of homogeneous redundant signal processing and heterogeneous redundant signal processing, wherein homogeneous redundant signal processing is performing a same function using a same architecture, and wherein heterogeneous redundant signal processing is performing one of the same function using different architectures and different functions using different architectures.

24. The method of claim 20, wherein the ROIC is configured to perform signal processing, and wherein each of at least one sub-mount device is a breakout circuit that is not configured to perform signal processing.

25. The method of claim 24, wherein each of the at least one ROIC is further configured to determine if a fault occurs in the redundant outputs and, if so, to reduce the two redundant outputs to one output.

26. The method of claim 24, wherein the at least one ROIC is further configured to be one of multiple integrated circuits and one integrated circuit, wherein each of the multiple integrated circuits outputs one of the redundant outputs, and wherein the one integrated circuit outputs all of the redundant outputs.

27. The method of claim 20, wherein the at least one optical device is one optical device, the at least one optical transducer is a first optical transducer and a second optical transducer, and the at least one electronic device is one read-out-integrated-circuit (ROIC) having two redundant paths for outputting the redundant outputs.

28. The method of claim 27, wherein the at least one optical device is one optical device, the at least one optical transducer is a first optical transducer and a second optical transducer, the at least one electronic device is an ROIC having a first processing path, a second processing path that is redundant of the first processing path, and a comparator,
wherein the one optical device is configured to receive the optical signal,
wherein the first optical transducer is configured to receive the optical signal from the one optical device and convert the optical signal to a first electrical signal, wherein the second optical transducer is configured to receive the optical signal from the one optical device and convert the optical signal to a second electrical signal, wherein the ROIC is configured to receive the first electrical signal and the second electrical signal, process the first electrical signal by the first processing path, process the second electrical by the second processing path, and compare the processed first electrical signal and the processed second electrical signal to determine if there is an error in either of the processed first electrical signal and the processed second electrical signal, and further comprising:

an error criteria function block configured to provide error criteria concerning the processed first electrical signal and the processed second electrical signal;

wherein the comparator is configured to receive the error criteria, the processed first electrical signal, and the processed second electrical signal; determine if an error occurred in one of the processed first electrical signal and the processed second electrical signal; if no error occurred, the ROIC outputs at least one of the processed first electrical signal and the processed second electrical signal; and if an error occurred, the ROIC outputs an error flag and a function of the processed first electrical signal and the processed second electrical signal that is determined to be error free.

29. The method of claim 27, wherein the at least one optical device is one optical device comprising a first diagnostics function block configured to provide diagnostics on the one optical device, the at least one optical transducer is a first optical transducer comprising a second diagnostics function block configured to provide diagnostics on the first optical transducer and a second optical transducer comprising a third diagnostics function block configured to provide diagnostics on the second optical transducer, the at least one electronic device is an ROIC having a first processing path, a second processing path that is redundant of the first processing path and comprising a fourth diagnostics function block configured to provide diagnostics on the ROIC, a global pixel reference function block comprising a fifth diagnostics function block configured to provide diagnostics on the global pixel reference function block, a global time-to-digital converter (TDC) references function block comprising a sixth diagnostics function block configured to provide diagnostics on the global TDC references function block, a temperature sensor comprising a seventh diagnostics function block configured to provide diagnostics on the temperature sensor, a clock and timing synchronization function block comprising an eighth diagnostics function block configured to provide diagnostics on the clock and timing synchronization function block, a digital converter comprising a comparator and a ninth diagnostics function block configured to provide diagnostics on the comparator, and a data output channels function block comprising a tenth diagnostics function block configured to provide diagnostics on the data output channels function block, wherein the one optical device is configured to receive the optical signal, wherein the first optical transducer is configured to receive the optical signal from the one optical device and convert the optical signal to a first electrical signal, wherein the second optical transducer is configured to receive the optical signal from the one optical device and convert the optical signal to a second electrical signal, wherein the ROIC is configured to receive the first electrical signal and the second electrical signal, process the first electrical signal by the first processing path, process the second electrical by the second processing path, and compare the processed first electrical signal and the processed second electrical signal to determine if there is an error in either of the processed first electrical signal and the processed second electrical signal, and further comprising:

an error criteria function block configured to provide error criteria concerning the processed first electrical signal and the processed second electrical signal;

wherein the comparator is configured to receive the error criteria, the processed first electrical signal, the processed second electrical signal, and diagnostics from the first through tenth diagnostic function blocks; determine if an error occurred in one of the processed first electrical signal and the processed second electrical signal; if no error occurred, the ROIC outputs at least one of the processed first electrical signal and the processed second electrical signal via the data output channels function block; and if an error occurred, the ROIC outputs an error flag and a function of the processed first electrical signal and the processed second electrical signal that is determined to be error free via the data output channels function block.

30. The method of claim 29, wherein the comparator comprises:

a subtractor configured to receive an output of the first processing path of the ROIC, receive an output of the second processing path of the ROIC, and subtract the output of the second processing path of the ROIC from the output of the first processing path of the ROIC;

a second comparator configured to compare the output of the subtractor to an error tolerance;

a combinatorial logic gate configured to perform a combinatorial logical operation on the output of the second comparator, at least one diagnostic from the first through tenth diagnostic function blocks, and to output an error flag when an error occurs; and an output data processor configured to receive the output of the first processing path of the ROIC, the output of the second processing path of the ROIC, and the output of the combinatorial logic gate, and a function of the outputs of the first processing path of the ROIC and the output of the second processing path of the ROIC that is determined to be error free.

31. The method of claim 20, wherein the at least one optical device is one optical device, the at least one optical transducer is a first optical transducer and a second optical transducer, and the at least one electronic device is a first read-out-integrated-circuit (ROIC) and a second ROIC.

32. The method of claim 20, wherein the at least one optical device is a first optical device and a second optical device, the at least one optical transducer is a first optical transducer and a second optical transducer, the at least one electronic device is a first read-out-integrated-circuit (ROIC) and a second ROIC, wherein the first optical device is configured to receive the optical signal, wherein the first optical transducer is configured to receive the optical signal from the first optical device and convert the optical signal to a first electrical signal, wherein the first ROIC is configured to receive the first electrical signal and process the first electrical signal, wherein the second optical device is configured to receive the optical signal, wherein the second optical transducer is configured to receive the optical signal from the second optical device and convert the optical signal to a second electrical signal, wherein the second ROIC is configured to receive the second electrical signal and process the second electrical signal, and further comprising:

an error criteria function block configured to provide error criteria concerning the processed first electrical signal and the processed second electrical signal; and a comparator configured to receive the error criteria, the processed first electrical signal, and the processed second electrical signal; determine if an error occurred in one of the processed first electrical signal and the processed second electrical signal; if no error occurred, output at least one of the processed first electrical signal and the processed second electrical signal; and if an error occurred, output an error flag and a function of the processed first electrical signal and the processed second electrical signal that is determined to be error free.

33. The method of claim 20, wherein the at least one optical device is a first optical device and a second optical device, the at least one optical transducer is a first optical transducer and a second optical transducer, the at least one electronic device is a first read-out-integrated-circuit (ROIC) and a second ROIC, wherein the first optical device is configured to receive the optical signal, wherein the first optical transducer is configured to receive the optical signal from the first optical device and convert the optical signal to a first electrical signal, wherein the first ROIC is configured to receive the first electrical signal and process the first electrical signal, wherein the second optical device is configured to receive the optical signal, wherein the second optical transducer is configured to receive the optical signal from the second optical device and convert the optical signal to a second electrical signal, wherein the second ROIC is configured to receive the second electrical signal and process the second electrical signal, and further comprising:

a diagnostic fault detector configured to receive the processed first electrical signal and the processed second electrical signal, determines if an error occurred in either of the processed first electrical signal and the processed second electrical signal, and outputs a control signal; and a switch configured to receive the processed first electrical signal, the processed second electrical signal, and the control signal, output the processed first electrical signal if no error occurred, and output a function of the first processed electrical signal and the processed second electrical signal that is error free when an error occurred.

34. The method of claim 20, wherein the at least one optical device is a first optical device and a second optical device, the at least one optical transducer is a first optical transducer and a second optical transducer, the at least one electronic device is a first read-out-integrated-circuit (ROIC) and a second ROIC, and further comprising:

a demultiplexer configured to receive the optical signal and segment the optical signal into a first segment and a second segment, wherein the second segment does not contain any portion of the optical segment contained in the first segment; and a multiplexer;

wherein the first optical device is configured to receive the first segment, wherein the first optical transducer is configured to receive the first segment from the first optical device and convert the first segment to a first electrical signal, wherein the first ROIC is configured to receive the first electrical signal and process the first electrical signal, wherein the second optical device is configured to receive the second segment, wherein the second optical transducer is configured to receive the second segment from the second optical device and convert the second segment to a second electrical signal, wherein the second ROIC is configured to receive the second electrical signal and process the second electrical signal, and wherein the multiplexer is configured to receive the processed first electrical signal and the processed second electrical signal, and output a combination of the processed first electrical signal and the processed second electrical signal.

35. The method of claim 20, wherein the at least one optical device is a first optical device and a second optical device, the at least one optical transducer is a first optical transducer and a second optical transducer, the at least one electronic device is a first read-out-integrated-circuit (ROIC) and a second ROIC, and further comprising:

a diagnostic fault detector;

a mode selector configured to output one of a signal indicating a redundant/comparison mode and a workload-sharing mode under control of one of an input signal and a determination of the optical signal;

a demultiplexer; and a multiplexer, wherein the demultiplexer is configured to receive the optical signal and segment the optical signal into a first segment and a second segment under control of the mode selector, wherein the first segment and the second segment are approximately identical when the mode selector outputs the signal indicating the redundant/comparison mode, and wherein the second segment does not contain any portion of the optical segment contained in the first segment when the mode selector outputs the signal indicating the workload-sharing mode;

wherein the first optical device is configured to receive the first segment, wherein the first optical transducer is configured to receive the first segment from the first optical device and convert the first segment to a first electrical signal, wherein the first ROIC is configured to receive the first electrical signal and process the first electrical signal, wherein the second optical device is configured to receive the second segment, wherein the second optical transducer is configured to receive the second segment from the second optical device and convert the second segment to a second electrical signal, wherein the second ROIC is configured to receive the second electrical signal and process the second electrical signal, wherein the diagnostic fault detector is configured to receive the processed first electrical signal and the processed second electrical signal, and output an error flag for use during the redundant/comparison mode; and wherein the multiplexer is configured to receive the processed first electrical signal, the processed second electrical signal, the signal from the mode selector, and the error flag, when in the redundant/comparison mode, output the processed first electrical signal if no error occurred, and output a function of the first processed electrical signal and the processed second electrical signal that is error free when an error occurred, and, when in the workload-sharing mode, output a combination of the processed first electrical signal and the processed second electrical signal.

36. A method of configuring an optical system to output redundant outputs, comprising:

configuring at least one optical device to receive an optical signal;

configuring each of at least one optical transducer to receive the optical signal from the at least one optical device and convert the optical signal to an electrical signal; and configuring at least one electronic device to receive each electrical signal and output the redundant outputs, wherein each of the at least one optical devices comprises an optical splitter configured to transmit the optical signal to each of the at least one optical transducer, and wherein the at least one electronic device comprises a read-out-integrated circuit (ROIC) configured to perform redundant signal processing.

37. The method of claim 36, wherein each of the at least one ROIC is further configured to perform redundant signal processing.

38. A method of configuring an optical system to output redundant outputs, comprising:

configuring at least one optical device to receive an optical signal;

configuring each of at least one optical transducer to receive the optical signal from the at least one optical device and convert the optical signal to an electrical signal; and configuring at least one electronic device to receive each electrical signal and output the redundant outputs, wherein the at least one optical device is one optical device, the at least one optical transducer is a first optical transducer and a second optical transducer, the at least one electronic device is a first read-out-integrated-circuit (ROIC) and a second ROIC, wherein the one optical device is configured to receive the optical signal, wherein the first optical transducer is configured to receive the optical signal from the one optical device and convert the optical signal to a first electrical signal, wherein the first ROIC is configured to receive the first electrical signal and process the first electrical signal, wherein the second optical transducer is configured to receive the optical signal from the one optical device and convert the optical signal to a second electrical signal, wherein the second ROIC is configured to receive the second electrical signal and process the second electrical signal, and further comprising:

an error criteria function block configured to provide error criteria concerning the processed first electrical signal and the processed second electrical signal; and a comparator configured to receive the error criteria, the processed first electrical signal, and the processed second electrical signal; determine if an error occurred in one of the processed first electrical signal and the processed second electrical signal; if no error occurred, output at least one of the processed first electrical signal and the processed second electrical signal; and if an error occurred, output an error flag and a function of the processed first electrical signal and the processed second electrical signal that is determined to be error free.

* * * * *

UNITED STATES PATENT AND TRADEMARK OFFICE
CERTIFICATE OF CORRECTION

PATENT NO. : 11,933,669 B2
APPLICATION NO. : 17/651250
DATED : March 19, 2024
INVENTOR(S) : Stephen A. Marshall et al.

It is certified that error appears in the above-identified patent and that said Letters Patent is hereby corrected as shown below:

In the Specification

Column 12, Line 25, delete "transducer 32" and replace with --transducer 31--.

Column 13, Lines 57-58, delete "system 60" and replace with --system 61--.

Column 18, Line 47, delete "system 93" and replace with --device 96--.

Column 19, Line 2, delete "the ROIC" and replace with --the second ROIC--.

Column 19, Line 31, delete "first optical" and replace with --second optical--.

Column 25, Line 46, delete "transducer 415," and replace with --transducer 413,--.

Column 26, Line 3, delete "first ROIC 421." and replace with --first ROIC 415.--.

Column 26, Line 8, delete "device 411," and replace with --device 417,--.

Column 26, Line 35, delete "signal 401" and replace with --signal 501--.

Column 26, Line 58, delete "transducer 515," and replace with --transducer 513,--.

Column 28, Line 31, delete "block 405" and replace with --block 607--.

Column 28, Line 56, delete "selector 627" and replace with --selector 611--.

Column 29, Line 25, delete "transducer 707" and replace with --transducer 705--.

Column 29, Line 48, delete "multiplexer 613" and replace with --multiplexer 713--.

Signed and Sealed this
Twenty-ninth Day of October, 2024

Katherine Kelly Vidal
*Director of the United States Patent and Trademark Office*